(12) United States Patent
Shah et al.

(10) Patent No.: US 12,465,376 B2
(45) Date of Patent: Nov. 11, 2025

(54) MEDIAL BIASED PATIENT-SPECIFIC INSTRUMENTATION AND RELATED METHODS

(71) Applicants: MicroPort Orthopedics Holdings Inc., Arlington, TN (US); Ritesh R. Shah, Morton Grove, IL (US)

(72) Inventors: Ritesh R. Shah, Glenview, IL (US); Duy Q. Dang, Olive Branch, MS (US); Juan D. Hernandez B., Alajuela (CR); Irving Romero Mora, Heredia (CR); Alejandra Barquero Mora, San Jose (CR); Brian R. Harris, Jr., Cordova, TN (US)

(73) Assignee: MicroPort Orthopedics Holdings Inc., Arlington, TN (US)

( * ) Notice: Subject to any disclaimer, the term of this patent is extended or adjusted under 35 U.S.C. 154(b) by 352 days.

(21) Appl. No.: 18/182,516

(22) Filed: Mar. 13, 2023

(65) Prior Publication Data

US 2023/0293191 A1 Sep. 21, 2023

Related U.S. Application Data

(60) Provisional application No. 63/269,642, filed on Mar. 21, 2022.

(51) Int. Cl.
*A61B 17/17* (2006.01)

(52) U.S. Cl.
CPC ................. *A61B 17/1764* (2013.01)

(58) Field of Classification Search
CPC ................ A61B 17/155; A61B 17/157; A61B 2017/0568; A61B 2090/037; A61B 2017/565
See application file for complete search history.

(56) References Cited

U.S. PATENT DOCUMENTS

| | | | |
|---|---|---|---|
| 5,768,134 A | 6/1998 | Swaelens et al. | |
| 5,798,924 A | 8/1998 | Eufinger et al. | |
| 9,017,334 B2 | 4/2015 | Carroll et al. | |
| 9,113,914 B2 | 8/2015 | Carroll et al. | |
| 9,642,632 B2 | 5/2017 | Stemniski et al. | |
| 10,624,654 B2 | 4/2020 | Weber | |
| 11,517,332 B2 | 12/2022 | Fiecher et al. | |
| 2004/0249387 A1* | 12/2004 | Faoro | A61B 17/155 606/88 |
| 2006/0036257 A1* | 2/2006 | Steffensmeier | A61B 17/155 606/90 |

(Continued)

FOREIGN PATENT DOCUMENTS

| EP | 3095398 | 11/2016 |
|---|---|---|
| FR | 3033691 | 9/2016 |

OTHER PUBLICATIONS

Fourcade, Olivier; European Search Report; Communication Report, Aug. 21, 2023; 1-9; European Patent Office; Munich, Germany.

*Primary Examiner* — David W Bates
(74) *Attorney, Agent, or Firm* — Robert J. Hornung

(57) ABSTRACT

Assemblies, systems, kits, and methods related to the positioning of the distal femoral resection guide anteromedially on an exposed condyle of the distal femur. Assemblies, systems, kits, and methods related to the positioning of the proximal tibial resection guide anteromedially on an exposed proximal tibia.

18 Claims, 13 Drawing Sheets

(56) References Cited

U.S. PATENT DOCUMENTS

| | | | |
|---|---|---|---|
| 2008/0195110 A1* | 8/2008 | Plassy | A61B 17/154 606/88 |
| 2010/0087829 A1* | 4/2010 | Metzger | A61B 34/10 606/96 |
| 2011/0071533 A1* | 3/2011 | Metzger | A61B 17/155 606/88 |
| 2011/0106093 A1* | 5/2011 | Romano | A61B 17/1675 606/88 |
| 2011/0218545 A1* | 9/2011 | Catanzarite | A61B 34/10 606/96 |
| 2012/0277751 A1* | 11/2012 | Catanzarite | A61B 17/1764 606/88 |
| 2012/0316564 A1* | 12/2012 | Serbousek | A61B 17/17 606/80 |
| 2013/0197528 A1* | 8/2013 | Zakaria | A61B 17/155 606/88 |
| 2014/0066720 A1 | 3/2014 | Wilkinson et al. | |
| 2015/0032113 A1* | 1/2015 | Anderson | A61B 17/15 606/88 |
| 2016/0066930 A1* | 3/2016 | Geeblen | A61B 17/155 606/88 |
| 2016/0089153 A1* | 3/2016 | Couture | A61B 34/10 606/88 |
| 2016/0367264 A1* | 12/2016 | Geebelen | A61B 17/1764 |
| 2017/0071677 A1* | 3/2017 | Utz | A61B 34/20 |
| 2018/0368860 A1* | 12/2018 | Wodajo | A61B 17/1703 |
| 2019/0223887 A1* | 7/2019 | Fritzinger | A61B 17/157 |
| 2019/0388240 A1* | 12/2019 | Courtis | A61F 2/4607 |
| 2022/0167992 A1* | 6/2022 | Xu | A61B 17/8061 |
| 2022/0167998 A1* | 6/2022 | Siccardi | A61B 17/1615 |

\* cited by examiner

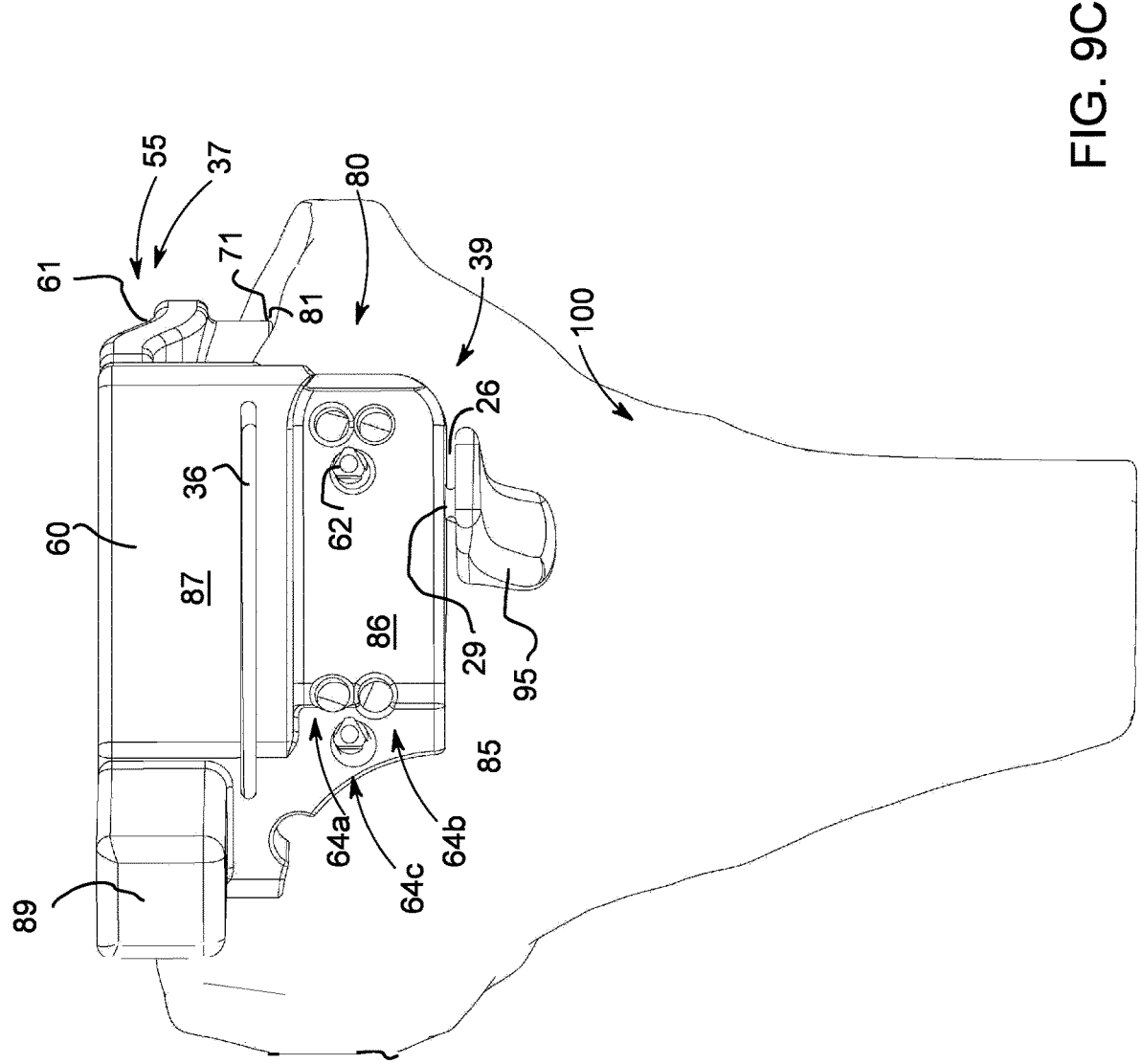

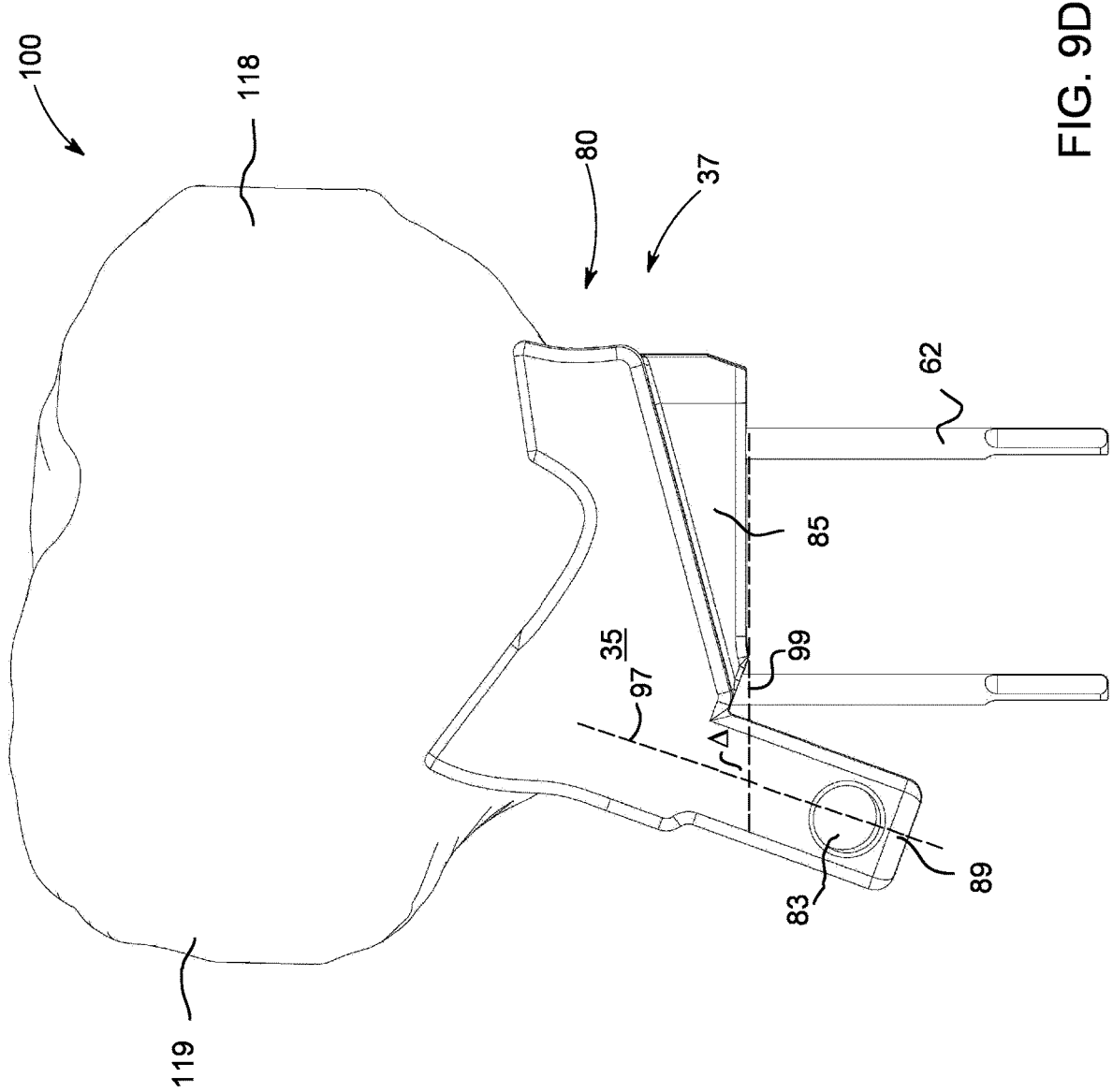

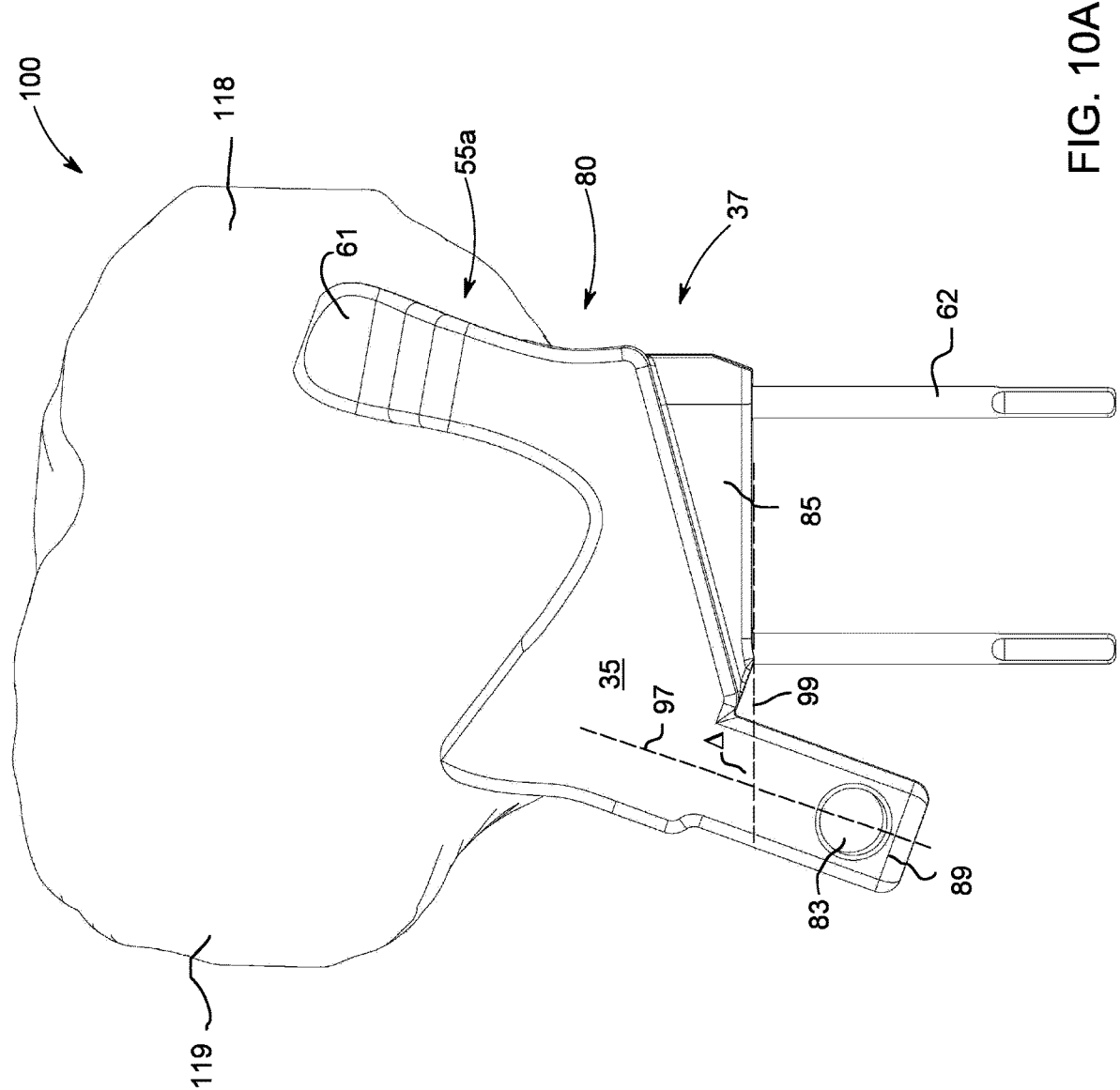

MEDIAL BIASED PATIENT-SPECIFIC INSTRUMENTATION AND RELATED METHODS

REFERENCE TO RELATED APPLICATION

This application claims the benefit of priority to U.S. Provisional Application No. 63/269,642 filed on Mar. 21, 2022. The disclosure of this related application is hereby incorporated into this disclosure in its entirety.

BACKGROUND OF THE INVENTION

1. Technical Field

The present disclosure relates generally to the field of knee implants, and more particularly, to patient-specific resection guide locators for minimally invasive knee arthroplasty surgical procedures.

2. Related Art

A common objective of knee replacement surgeries is to restore the natural alignment and rotational axis of the pre-diseased joint. However, this objective can be difficult to achieve in practice because joints comprise not just the articulating bones but also ancillary supporting bones and a variety of soft tissue, including cartilage, ligaments, and tendons. In the past, surgeons avoided restoring natural alignment altogether or estimated alignment angles and other dimensions based on averages derived from a sample of the population. However, these averages often failed to account for natural variation in the anatomy of the specific patient, particularly when the patient suffered from chronic bone deforming diseases like osteoarthritis.

To address this, some care providers began using computed tomography ("CT") scans and magnetic resonance imaging ("MRI") techniques to survey patients' internal anatomy to help plan orthopedic surgeries. Data from these CT scans and MRIs have even been used to create three dimensional ("3D") models in digital form. These models could be sent to professionals to design and produce patient-specific implants and instruments for said surgery. Additive manufacturing techniques (e.g., 3D printing) and other conventional production techniques could be used to construct physical implants or resection guide instruments that fit the patient's specific anatomy. It was contemplated that such patient-specific resection guides could permit more accurate and customized placement of the distal femoral and proximal tibial resections, and by extension, more accurate and customized placement of a properly sized endoprosthetic joint implant. Proper implant sizing and placement, in turn can lead to a patient post-operative experience that is comparable to the experience that the patient had with the pre-diseased joint. For examples of this technology, reference is made to U.S. Pat. Nos. 9,017,334 and 9,113,914, the entirely of each are incorporated herein by reference.

However, such patient-specific instruments were not compatible with minimally invasive procedures. Take for example a standard total knee arthroplasty ("TKA"). In a standard TKA, the surgeon makes a six to eight inch medial parapatellar incision through certain quadriceps tendons and muscles. The surgeon then everts the patella around the quadriceps tendon and the patellar tendon to expose the joint capsule. Once exposed, the surgeon pierces the joint capsule and uses various instrumentation to measure and resect the distal aspect of the femur and the proximal aspect of the tibia to install an endoprosthetic knee implant. The standard six to eight inch incision provides sufficient access to the joint area to accommodate a variety of standard instrumentation. However, the standard six to eight inch incision can also contribute to an average recovery time of two to three months, increased patient discomfort as the muscles heal, and increased risk of infection during the procedure itself.

In a minimally invasive TKA, the medial parapatellar incision is about three to four inches on average and can be positioned more medially compared to standard non-minimally invasive procedures. While this practice can generally improve recovery times and reduce patient discomfort, the shorter incision is also generally not large enough to permit eversion and subluxation of the patella. As a result, there is a reduced aperture to the surgical area, which can limit the size and types of instrumentation that can be positioned directly on the distal femur or the proximal tibia to measure and resect the distal femur and the proximal tibia for placement of the implant. This limitation rendered patient-specific instrumentation generally incompatible with minimally invasive TKAs.

SUMMARY OF THE INVENTION

The risk of inaccurate placement of endoprosthetic implants in a minimally invasive knee arthroplasty is solved by an exemplary patient-specific resection guide locator comprising: a body, a first positioning member extending from the body, the first positioning member having a bone engaging surface that is configured for complementary matching with a set of anatomical surface features of a selected region of the patient's natural bone, a second positioning member extending from the body, the second positioning member being distally disposed from the first positioning member, and an anteromedial flange extending from the body between the first positioning member and the second positioning member, wherein the anteromedial flange is disposed at an offset angle relative to a sagittal plane of the body.

It is contemplated that certain exemplary embodiments described herein may be particularly well suited for use in minimally invasive TKAs that seek to install a unicondylar endoprosthetic implant.

It is further contemplated that exemplary embodiments described herein may permit anteromedial placement of a fixation pin through a smaller mediolateral incision than was previously possible. Without being bound by theory, it is contemplated that placing a fixation pin with the exemplary patient-specific resection guides described herein may permit the surgeon to resect one or more condyles precisely and thereby prepare the joint for desired implant alignment without harming the medial collateral ligament ("MCL") and without harming the medial condyle from which the MCL originates.

It is still further contemplated that procedures that utilize the exemplary patient-specific resection guides described herein permits the surgeon to place fixation pins while obviating the potential for visual obstruction by the quadriceps tendon and/or the patella. The improved visibility attributable to the exemplary procedures and patient-specific resection guides described herein may further contribute to reduced procedures times compared to prior approaches.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

FIG. 9C is anterior view of the exemplary patient-specific tibial resection guide locator of FIGS. 9A and 9B.

FIG. 9D is a top down view of the exemplary embodiment of a patient-specific tibial resection guide locator and tibia of FIGS. 9A, 9B and 9C, wherein the breakaway positing members have been removed.

FIG. 10A is a top down view of an exemplary embodiment of a patient-specific tibial resection guide locator engaged to the proximal aspect of an exposed tibia, wherein the tibial resection guide locator comprises a single superior positioning member.

DETAILED DESCRIPTION OF THE PREFERRED EMBODIMENTS

Figure 1:
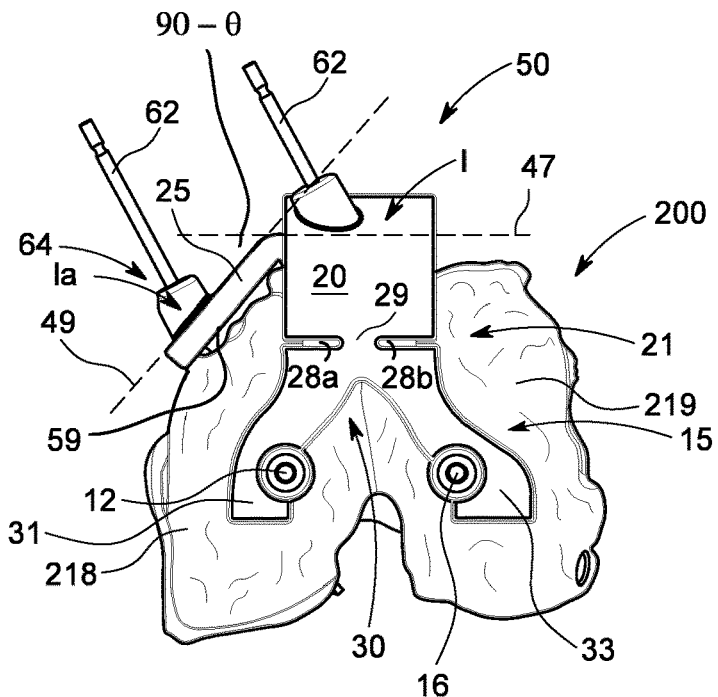
FIG. 1 is a distal view of an exemplary patient-specific femoral resection guide locator engaged to the distal aspect of an exposed femur in flexion.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as such circumstances require; (b) the singular terms "a," "an," and "the," as used in the specification and the appended claims include plural references unless the context clearly dictates otherwise; (c) the antecedent term "about" applied to a recited range or value denotes an approximation with the deviation in the range or values known or expected in the art from the measurements; (d) the words, "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning of construction of part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether explicitly described.

To the extent necessary to provide descriptive support, the subject matter and/or text of the appended claims are incorporated herein by reference in their entirety.

Recitation of ranges of values herein are merely intended to serve as a shorthand method of referring individually to each separate value falling within the range of any sub-ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range of sub range thereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms, "upper" and, "lower" are relative to each other in location, i.e., an upper component is located at a higher elevation than a lower component in each orientation, but these terms can change if the orientation is flipped. The terms, "horizontal" and "vertical" are used to indicate direction relative to an absolute reference, i.e., ground level. However, these terms should not be construed to require structure to be absolutely parallel or absolutely perpendicular to each other. For example, a first vertical structure and a second vertical structure are not necessarily parallel to each other.

Throughout this disclosure, various positional terms, such as "distal," "proximal," "medial," "lateral," "anterior," "posterior," "superior," and "inferior" will be used in the customary manner when referring to the human anatomy. More specifically, "distal" refers to the area away from the point of attachment to the body, while "proximal" refers to the area near the point of attachment to the body. For example, the distal femur refers to the portion of the femur near the tibia, whereas the proximal femur refers to the portion of the femur near the hip. The terms, "medial" and "lateral" are also essentially opposites. "Medial" refers to something that is disposed closer to the middle of the body. "Lateral" means that something is disposed closer to the right side or the left side of the body than to the middle of the body. Regarding, "anterior" and "posterior," "anterior" refers to something disposed closer to the front of the body, whereas "posterior" refers to something disposed closer to the rear of the body." Regarding "superior" and "inferior" when used in reference to human anatomy, "superior" refers to something disposed above a point of reference whereas "inferior" refers to something disposed below a point of reference. When used in reference to a "positioning member" or other component of exemplary resection guide locators described herein, "superior" and "inferior" refer to the components as they would be positioned when placed on their corresponding anatomical structure (e.g., the exposed distal femur for the femoral resection guide and the exposed tibia for the tibial resection guide).

"Varus" and "valgus" are broad terms and include without limitation, rotational movement in a medial and/or lateral direction relative to the knee joint.

The term, "mechanical axis" of the femur refers to an imaginary line drawn from the center of the femoral head to the center of the distal femur at the knee.

The term, "anatomic axis" refers to an imaginary line drawn lengthwise down the middle of femoral shaft or tibial shaft, depending upon use.

During a primary minimally invasive TKA, the surgeon typically makes a generally vertical medial parapatellar incision of about three to four inches on the anteromedial side of the operative knee.

The surgeon continues to incise the fatty tissue to expose the anteromedial aspect of the joint capsule. The surgeon may then perform a medial parapatellar arthrotomy to pierce the joint capsule and resect the medial patellar retinaculum. A retractor may then be used to move the patella generally laterally (roughly about 90 degrees) to expose the distal condyles of the femur and the cartilaginous meniscus resting on the proximal tibial plateau. The surgeon then removes the meniscus and uses instrumentation to measure and resect the distal femur and proximal tibia to accommodate trial implants. Trial implants are test endoprostheses that generally have the same functional dimensions of the actual endoprostheses, but trial implants are designed to be temporarily installed and removed for the purposes of evaluating the fit of the actual endoprostheses and for the purposes of evaluating the knee joint's kinematics. The surgeon removes the trial implants and installs the actual implants once the surgeon is satisfied with the trial implant's sizing and the knee joint's kinematics.

This tibial resection is usually coplanar with a transverse body plane that is perpendicular to the anatomic axis of the tibia. Once resected, the resected area of the tibia can be known as the "tibial plateau." Next, the surgeon may place a trial tibial component on the resected proximal tibial plateau. The surgeon generally uses different instrumentation to measure and resect the distal femoral condyles for the purpose of installing a trial femoral component. If the trial components are not seated appropriately, the surgeon my use further instrumentation to measure and resect the femoral condyles and/or the tibial plateau until the desired seating is achieved.

The surgeon then generally inserts a trial meniscal insert between the trial tibial tray and the trial femoral component to test the knee's flexion and extension, general stability, and patellar tracking on the trial implants. Once satisfied with the trial and movement characteristics, the surgeon can use bone cement to permanently affix the actual tibial and femoral components of the endoprosthetic implant or use a press-fit implant and avoid use of bone cement if desired.

The instruments described in this present disclosure (i.e., the exemplary patient-specific resection guide locators 50, 80) largely relate to the step of resecting the distal femur and proximal tibia after the meniscus has been removed. The act of resection creates resected surfaces on the bone. The trial implant components and eventually the actual functional components of the endoprosthetic implant are eventually placed onto these resected surfaces. The placement of these resected surfaces therefore greatly influences the position and overall functional kinematics of the installed endoprosthetic implant.

Figure 2:
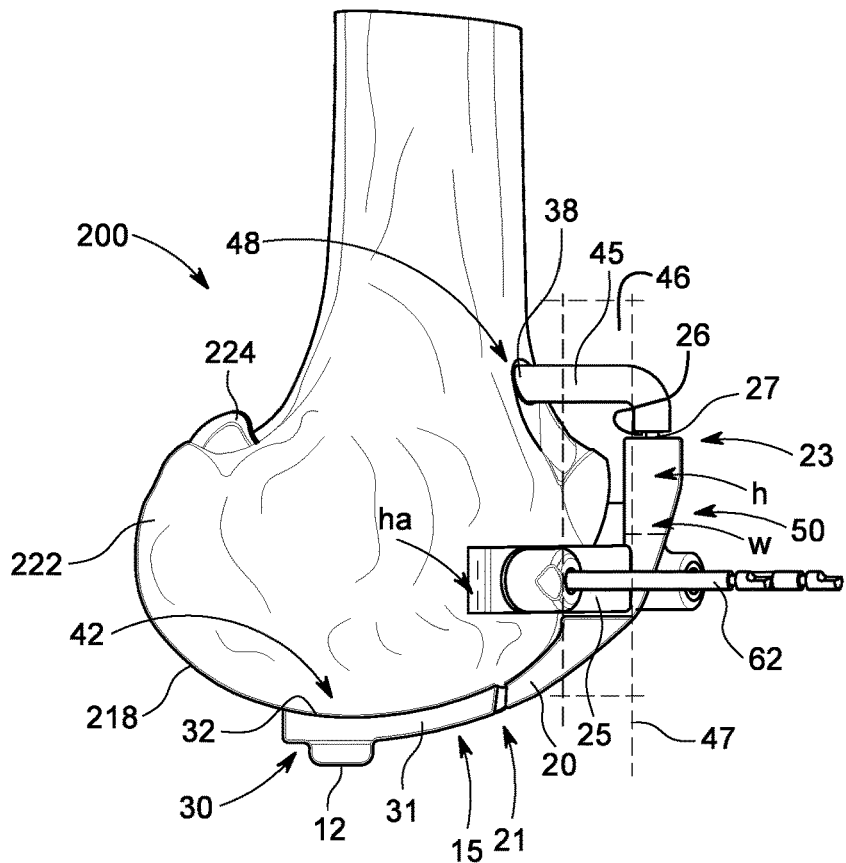
FIG. 2 is a medial view of the exemplary patient-specific femoral resection guide locator depicted in FIG. 1, but the femur is depicted in extension.

FIG. 1 depicts an exemplary patient-specific femoral resection guide locator 50 that is disposed on the distal aspect of an exposed femur 200. The distal femur 200 comprises a medial condyle 218, a lateral condyle 219, a medial posterior condyle 222 (FIG. 2) and a lateral posterior condyle 224 (FIG. 2).

In the depicted embodiment, the exemplary patient-specific femoral resection guide locator 50 has a body 20 and a first positioning member 15 extending from the body 20. In embodiments in which the first positioning member 15 is on a patient-specific femoral resection guide locator 50 (e.g., as shown in FIG. 2), the first positioning member 15 can be known as an "inferior positioning member" or a "femoral inferior positioning member." A "positioning member" is generally a protrusion or an extension extending of or from the body 20. The positioning member desirably has a distal side (relative to a person implanting the resection guide locators 50, 80 on the target bone) that has a bone engaging surface (see 32, FIG. 2) that is configured for complementary matching with corresponding anatomical surface features on the patient's exposed bone. That is, when the distal side of the positioning member is disposed on the corresponding anatomical surfaces features, the anatomical surface features and the bone engaging surface can have matching topography such that they interlock.

In the depicted embodiment, the first positioning member 15 comprises an inferior bifurcated condylar yoke 30 extending from an inferior end 21 of the body 20. The inferior bifurcated condylar yoke 30 further comprises a first arm 31 and a second arm 33 that is spaced apart from the first arm 31. The first arm 31 has a first inferior bone engaging surface 32 (FIG. 2) that is configured for complementary matching with a first set of inferior anatomical surface features 42 of a selected region of the patient's natural bone. Likewise, the second arm 33 has a second inferior bone engaging surface (not depicted, but see the first bone engaging surface 32 of FIG. 2) that is configured for complementary matching with a second set of inferior anatomical surface features of a selected region of the patient's natural bone (not depicted, but see the first set of inferior anatomical surface features of a selected region of the patient's natural bone 42 of FIG. 2).

It will be appreciated that although having bone engaging surfaces 32, 38 that are configured for matching with complementary topographical anatomical features of the femur 200 is desirable because it is contemplated that such surfaces may allow a surgeon to seat the exemplary femoral resection guide locator 50 on the distal femur 200 in a desired location more precisely and more quickly (compared to bone engaging surfaces 32, 38 that lack patient-specific topographical engagement features), nothing in this disclosure shall be construed to require the bone engaging surfaces 32, 38 to be patient-specific unless otherwise stated. Non-patient-specific bone engaging surfaces 32, 38 are considered to be within the scope of this disclosure.

The exemplary patient-specific femoral resection guide locator 50 further comprises a second positioning member 45 (FIG. 2) extending from a superior end 23 of the body 20 (e.g., is distally disposed from the first positioning member 15) and an anteromedial flange 25 extending from the body 20 between the inferior bifurcated condylar yoke 30 and the second positioning member 45. In embodiments in which the second positioning member 45 is on a patient-specific femoral resection guide locator 50 (e.g., as shown in FIG. 2), the second positioning member 45 can be known as a "superior positioning member" or a "femoral superior positioning member." The anteromedial flange 25 is disposed at an offset angle $\theta$ relative to a femoral reference sagittal plane 46 of the body 20. When the offset angle $\theta$ is described with reference to the femoral resection guide locator, the offset angle $\theta$ may be known as a "femoral offset angle $\theta$". The femoral offset angle $\theta$ is defined by the intersection of a femoral reference sagittal plane 46 of the body 20 and a reference flange plane 49 that is generally coplanar with a flange length (la) and a flange height (ha) of the anteromedial flange 25. It will be understood that the femoral reference sagittal plane 46 and the reference flange plane 49 are imaginary planes that can be imagined to reference their corresponding elements as described. The reference flange plane 49 is disposed co-planar with the flange height (ha) and the flange length (la) of the anteromedial flange 25. Likewise, the femoral reference sagittal plane 46 is disposed co-planar with a height (h) and a width (w) of the body 20 preferably at the location in which the distal end of the superior positioning member 45 is disposed against the patient's bone in the installed configuration.

It will be appreciated that a complementary femoral offset angle $90-\theta$ may be used to measure the angled relationship between the anteromedial flange 25 and the body 20 of the femoral resection guide locator 50. The complementary femoral offset angle $90-\theta$ is defined by 90 degrees (°) minus the femoral offset angle $\theta$. In the depicted embodiments, this relationship is represented by the intersection of a reference frontal plane 47 of the body 20 and the reference flange plane 49. The reference frontal plane 47 can be imagined to be coplanar with the length (l) and height (h) of the body 20. In the depicted embodiment, the frontal plane 47 intersects the reference flange plane 49 at the location in which the reference flange plane 49 abuts the body 20. It will be understood that the frontal plane 47 is an imaginary plane that can be imagined to reference its corresponding elements as described.

In certain exemplary embodiments, the femoral offset angle $\theta$ can be selected from a range of values between (and including) about 20° to about 50° and preferably between about 25° to about 45°. It will be appreciated that the exact value of the femoral offset angle $\theta$ can be determined based on the patient's specific anatomy that is desirably assessed from preoperative imaging data. Without being bound by theory, it is contemplated that a femoral resection guide locator 50 having an anteromedial flange 25 disposed at an offset angle $\theta$ selected from a value within either of these exemplary ranges may permit the placement of a resection guide 90 and ultimately allow for the resection of the femur 200 more medially that was previously possible while using a substantially smaller incision compared to conventional hip arthroplasty techniques that utilize a six to eight inch incision.

In exemplary embodiments the through bores 64 of the anteromedial flange 25 can be disposed at a pin angle $\lambda$. The pin angle $\lambda$ is the angle formed by the intersection of the through bore length (bl) of a through bore 64 of the anteromedial flange 25 and the reference flange plane 49. It will be appreciated that the pin angle $\lambda$ has a supplementary pin angle, which can be expressed as $180-\lambda$. Although the pin angle is depicted as an acute angle, it will be appreciated that the pin angle can by a right angle or an obtuse angle. In embodiments in which the pin angle $\lambda$ is an acute angle as shown, it is contemplated that the pin angle $\lambda$ can be selected from a range of values between (and including) about 40° to about 80°. It is contemplated that a majority of cases may fall within the range of 50° to 75°. Without being bound by theory, it is contemplated that having a pin angle $\lambda$ selected from a value within one of the provided ranges can position the through bores 64 more ergonomically for the surgeon and facilitate alignment with the minimally invasive incision to facilitate insertion of the fixation pins 62.

In embodiments, the anteromedial flange 25 can be a modular piece that is selectively removable from the body 20 of the femoral resection guide locator 50. It is contemplated that having a modular anteromedial flange 25 may permit surgeons to adjust the offset angle $\theta$ to better access the distal femur 200 through the smaller incision of a minimally invasive procedure. It is contemplated that the anteromedial flange 25 may be selectively or removably engaged to the body of the femoral resection guide locator 50 by complementary protrusions and recessions, such as rails, or any of the other "fixation means" disclosed herein.

In the installed configuration, the anteromedial flange 25 is desirably disposed on the medial side of the distal femur 200 to align with the minimally invasive three to four inch incision that is located more medially on the patient's knee compared to the location of the incision on more traditional knee arthroplasties.

In certain exemplary embodiments, it is further contemplated that the surface of the anteromedial flange 25 that is to be disposed most proximal to the distal femur 200 in an installed configuration (i.e., when the patient-specific femoral resection guide locator 50 is disposed on the exposed distal femur 200) can further comprise an anteromedial flange bone engaging surface 59. In certain exemplary embodiments, the anteromedial flange bone engaging surface 59 can be further configured for complementary matching with corresponding adjacently disposed anatomical surface features of the patient's natural bone (when the patient-specific femoral resection guide locator 50 is disposed in the installed configuration). Without being bound by theory, it is contemplated that an anteromedial flange 25 having such a complementary anteromedial flange bone engaging surface 59 may further permit securing the patient-specific femoral resection guide locator 50 to the patient at the desired location, wherein the patient-specific femoral resection guide locator 50 has a minimal design profile, which can be more compatible with minimally invasive surgical techniques.

In the depicted embodiment, the anteromedial flange 25 further comprises fixation pin through bores 64 through which fixation pins 62 may be inserted therethrough into the underlying bone. The first arm 31 and the spaced apart second arm 33 can further comprise through bores 12 and 16 respectively for fixation pins 62 as well. The superior positioning member 45 further comprises a superior positioning member first superior bone engaging surface 38 that is configured for complementary matching with a superior set of anatomical surface features 48 of a selected region of the patient's natural bone (FIG. 2). It will be appreciated that in other exemplary embodiments, the superior positioning member 45 may have a first superior bone engaging surface 38 that is not configured for complementary matching with a superior set of anatomical surface features 48 of a selected region of the patient's natural bone.

In other exemplary embodiments, the anteromedial flange 25 further comprises a guide receptacle. In exemplary embodiments, the femoral resection guide locator 50 can be manufactured from biocompatible medical grade polyamide. Such polyamides can include nylon biocompatible medical grade polyamides for example. In other embodiments, the femoral resection guide locator 50 can be manufactured from other clinically proven biocompatible materials, such as cobalt chrome, or titanium.

Figure 3:
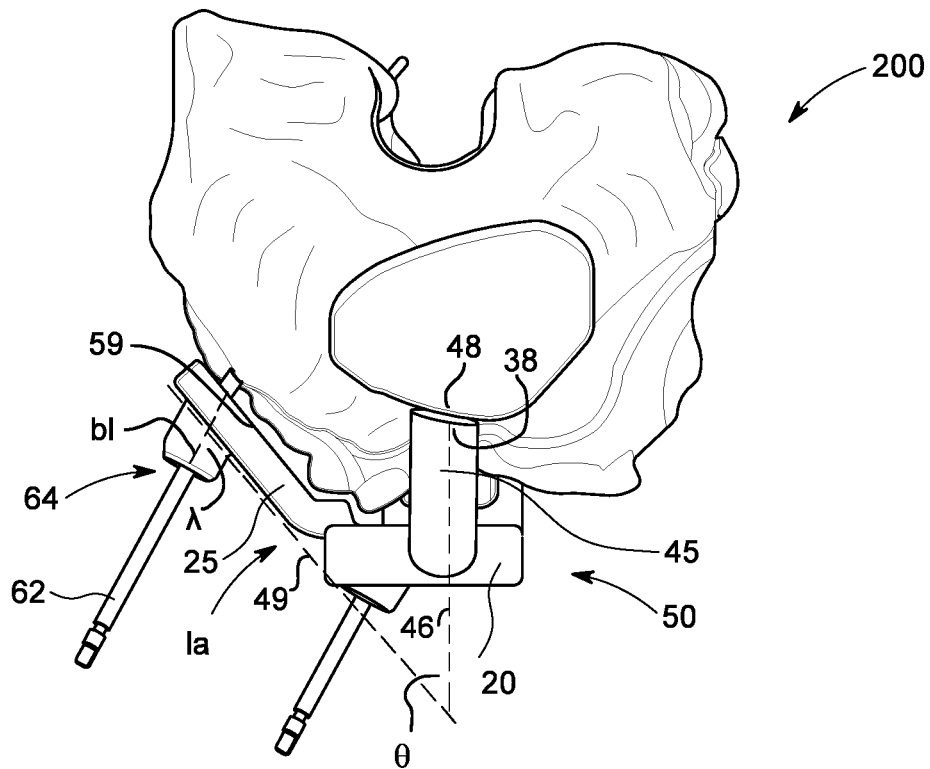
FIG. 3 is a top down view of the exemplary patient-specific femoral resection guide locator shown disposed on the femur depicted in FIGS. 1 and 2.
Figure 4:
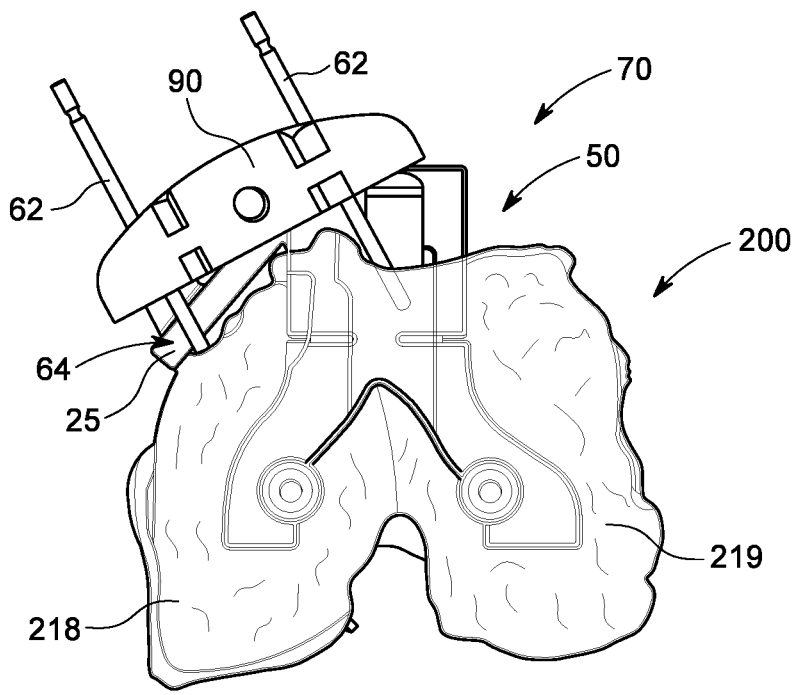
FIG. 4 is a distal view of an exemplary patient-specific femoral resection guide locator assembly engaged to the distal aspect of an exposed femur in flexion.

FIG. 4 shows a distal resection guide 90 superimposed on top of an image of the patient-specific femoral resection guide locator 50 depicted in FIGS. 1-3. In practice, the patient-specific femoral resection guide locator 50 is manufactured using patient-specific data that is derived from the pre-operative planning stage. Pre-operative planners can use CT scans, MRI scans, radiography and algorithms that extract three dimensional data from two dimensional projections, or any other scanning technology that permits persons to map the topography (i.e., the location, shape, size, and distribution) of surface features such as concavities and prominences or the like of the target bone. Using this information and a computer, technicians can create a virtual 3D model of the target bone (e.g., the distal femur 200 in this case, but see also the proximal tibia 100). This model can be placed in a virtual volume (e.g., a virtual cube encompassing the virtual model). The model can then be subtracted from the virtual volume to define a negative virtual model having a surface topography that is complementary to the surface topography of the initial virtual model. If the negative model is imported into a computer design program (e.g., a program capable of reading and manipulating .CAD type or other 3D virtual model files), designers can extract sections of the topography of the negative virtual model to place upon the ends of a virtual model of the positioning members to thereby define bone engaging surfaces (e.g., 32 and 38). The designers can further place the ends of the positioning members (i.e., the bone engaging surfaces 32 and 38) at locations that correspond to the natural surface topography of the target bone when the patient-specific resection guide locator 50, 80 is placed in an installed configuration. The patient-specific resection guide locators 50, 80 can then be manufactured from the design files (i.e., virtual model) of the patient-specific resection guide locators 50, 80 having the patient-specific bone engaging surfaces in the desired locations. In this manner, the described bone engaging surfaces (e.g., 32 and 38) can be said to be "configured for complementary matching with" their indicated set of anatomical surface features.

U.S. Pat. No. 5,768,134 to Swaelens et. al. and U.S. Pat. No. 9,017,334 to Carroll et. al. further detail improvements to this technique, particularly in regard to creating patient-specific instrumentation for orthopedic surgical procedures. The entirety of each patent is incorporated herein by reference.

In a minimally invasive TKA, the medial parapatellar incision is about three to four inches on average and can be positioned more medially compared to standard non-minimally invasive procedures. While minimally invasive procedures can generally improve recovery times and reduce patient discomfort, the shorter incision does not generally permit eversion and subluxation of the patella. As a result, there is a reduced aperture to the surgical area, which can limit access and surgeon visualization of the operative area. Upon exposure of the surgical area in a minimally invasive knee arthroplasty, the surgeon can insert an exemplary patient-specific femoral resection guide locator 50 through the surgical opening and position the exemplary patient-specific femoral resection guide locator 50 on the distal femur 200 as exemplified in FIGS. 1-4.

Without being bound by theory, it is contemplated that exemplary patient-specific femoral resection guide locators 50 having an anteromedial flange 25 disposed at an offset angle $\theta$ results in a more compact design compared to existing resection guide locators. This compact design, and the patient-specific bone engaging surfaces (e.g., 32 and 38) may allow the surgeon to access the operative area through the reduced surgical aperture and be confident that the patient-specific femoral resection guide locator 50 is properly positioned relative to the patient when the bone engaging surfaces (e.g., 32 and 38) engage their complementary anatomical surfaces features on the patient's bone (e.g., 42 and 48 respectively).

Furthermore, it is contemplated that the curved shape of the body 20 and positioning members 15, 45 of the patient-specific femoral resection guide locator 50 can store potential energy in the body 20. This feature, together with the at least the first inferior bone engaging surface 32 and the first superior bone engaging surface 38 of the superior positioning member 45 that are respectively configured for placement on a first inferior and superior set of complementary anatomical surface features of selected regions of the patient's natural bone (42 and 48 respectively) may permit the patient-specific femoral resection guide locator 50 to apply a holding force. In this manner, the exemplary patient-specific femoral resection guide locator 50 may "snap-fit" into the optimal location for placing resection instrumentation based on the patient's unique anatomy.

It is contemplated that in certain exemplary embodiments, the posterior side of the body 20 may further comprise a bone engaging surface that is configured for complementary matching with a set of anatomical surface features of a selected region of the patient's natural bone.

Once the exemplary patient-specific femoral resection guide locator 50 is properly positioned and seated in this manner, the surgeon may use a surgical drill to create drill bores through the through bores 64 present on the anteromedial flange 25 of the patient-specific femoral resection guide locator 50. Once drilled, the surgeon may place one or more fixation pins 62 through the desired through bore 64 and into the newly created drill bore in the underlying bone. Depending on preference and design, the surgeon may then remove the exemplary patient-specific femoral resection guide locator 50 from the distal femur 200 while keeping the fixation pins 62 inserted.

Recesses 28a, 28b disposed between the inferior end 21 of the body 20 of the femoral resection guide locator 50 and the inferior bifurcated condylar yoke 30 define an inferior narrow bridge 29 in the depicted embodiment. Similarly, an annular recession 26 disposed between the superior end 23 of the body 20, and the superior positioning member 45 defines a superior narrow bridge 27. The inferior and superior narrow bridges 29, 27 are structurally weaker than the adjacent body 20 and bifurcated condylar yoke 30 and superior positioning member 45 respectively. In this manner, the superior and inferior positioning members 15, 45 depicted in FIGS. 1 and 2 can be said to be "breakaway" positioning members.

In practice, the contours of the corresponding bone topography can be sufficiently deep and/or the area be sufficiently extensive that the patient-specific engagement surfaces 31, 38 create a fairly stable bond with the complementary anatomical surfaces 32, 48 when engaged. If the surgeon desires, the surgeon may break the patient-specific femoral resection guide locator 50 at the inferior narrow bridge and/or superior narrow bridge to facilitate removal of the femoral resection guide locator 50 from the distal femur 200 after the fixation pins 62 have been inserted through the through bores 64, and into the bone at the desired location. Removing the femoral resection guide locator 50 in this manner leaves the fixation pins 62 inserted into the underlying bone. It is contemplated that embodiments that comprise breakaway positioning members could be used more frequently when the femoral resection guide locator 50 is manufactured from a biocompatible medical grade polyamide because such polyamides are generally less resilient to shear and torsional forces at the narrow bridges 29, 27, especially when compared to metals such as cobalt chrome, or titanium. However, nothing in this disclosure should be construed to prevent the use of the breakaway positioning members with cobalt chrome or titanium. It is further contemplated that in exemplary embodiments that do have breakaway positioning members and in which the femoral resection guide locator 50 is manufactured from a durable biocompatible material such as cobalt chrome, or titanium, the narrow bridges 29, 27 can desirably be manufactured from a medical grade polyamide or other biocompatible material that is less resilient to shear and torsional forces than the metal. In such exemplary embodiments, the narrow bridges 29, 27 can be bonded to the body 20 of the femoral resection guide locator 50 and the positioning members 15, 45 prior to the femoral resection guide locator 50 being introduced into the minimally invasive incision.

Breakaway positioning members may be desirable in embodiments in which the patient-specific femoral resection guide locator 50 snap fits onto the distal femur 200. Instead of counteracting the compressive forces that engage such femoral resection guide locators 50 to the femur, the surgeon may simply remove the breakaway positioning members to release the femoral resection guide locator 50 after the fixation pins 62 have been inserted into the bone. Such embodiments may ultimately contribute to reduced procedure time, which could result in the patient spending less time under anesthesia.

In other exemplary methods of use, especially if the exemplary embodiment does not have breakaway positioning members, the surgeon may elect to simply slide the femoral resection guide locator 50 over the inserted fixation pins 62 to thereby remove the femoral resection guide locator 50 from the surgical area while leaving the fixation pins 62 inserted into the bone. Combinations of the foregoing are considered to be within the scope of this disclosure.

After removal of the patient-specific femoral resection guide locator 50, the surgeon can place the femoral resection guide 90 on the remaining fixation pins 62. The resection guide comprises a resection slot through which the surgeon can insert a saw to resect the distal femur 200 in a location desirable for the correct placement of an endoprosthetic implant. Without being bound by theory, it is contemplated that placement of the resection guide mediolaterally through use of the exemplary patient-specific femoral resection guide locator 50 described herein permits the surgeon to use patient-specific instrumentation and implants in a minimally invasive knee arthroplasty to thereby realize the benefits of natural implant positioning, possible restored kinematic function, and the benefits of improved healing time and less patient discomfort.

FIG. 4 further illustrates that an exemplary patient-specific femoral resection guide locator assembly 70 can have an assembled configuration and a disassembled configuration. In the assembled configuration, an exemplary patient-specific femoral resection guide locator assembly 70 can comprise: a patient-specific femoral resection guide locator 50 having resection guide fixation means (e.g., fixation pins 62, projection or receiver mechanical locking mechanisms, an embedded magnet, etc.) engaged to complementary resection guide fixation means (e.g., through bores 64, projection or receiver mechanical locking mechanisms that are complementary to the projection or receiver mechanical locking mechanism of the resection guide locator or fixation pins 62, an embedded magnet of opposite polarity to the embedded magnet of the femoral resection guide locator when adjacently disposed, etc.) of a femoral resection guide 90. In a disassembled configuration, the resection guide 90 is not engaged to the patient-specific femoral resection guide locator 50.

In such an exemplary assembly, the exemplary patient-specific femoral resection guide locator 50 can comprise: a body 20, an inferior bifurcated condylar yoke 30 extending from an inferior end 21 of the body 20. The inferior bifurcated condylar yoke 30 can have a first arm 31 and a second arm 33. The first arm 31 has a first inferior bone engaging surface 32 that is configured for complementary matching with a first set of inferior anatomical surface features 42 of a selected region of the patient's natural bone, when the patient-specific femoral resection guide locator 50 is disposed in the installed configuration. The second arm 33 has a second inferior bone engaging surface that is configured for complementary matching with a second set of inferior anatomical surface features of a selected region of the patient's natural bone, when the patient-specific femoral resection guide locator 50 is disposed in the installed configuration. It will be appreciated that the exemplary patient-specific femoral resection guide locators 50 described herein can further have an uninstalled configuration, when the patient-specific femoral resection guide locator 50 is not placed on the distal femur 200.

The exemplary patient-specific femoral resection guide locator 50 further comprises a superior positioning member 45 extending from a superior end 23 of the body 20, and an anteromedial flange 25 extending from the body 20 between the inferior bifurcated condylar yoke 30 and the superior positioning member 45. The anteromedial flange 25 is disposed at a femoral offset angle θ relative to a femoral reference sagittal plane 46 of the body 20. The anteromedial flange 25 has resection guide fixation means. Without being bound by theory, it is contemplated that the anteromedial flange 25 on the exemplary patient-specific femoral resection guide locator 50 may permit the surgeon to place a fixation pin 62 or other resection guide fixation means anteromedially through a smaller mediolateral incision than was previously possible. The compact size of the patient-specific femoral resection guide locator 50 and the orientation of the anteromedial flange 25 may allow the surgeon to insert the resection guide locator 50 through the three to four inch medial parapatellar incision onto the exposed femoral condyles (e.g., the medial condyle 218 and a lateral condyle 219 or the medial posterior condyle 222 and a lateral posterior condyle 224 as the case may be).

The four inch medial parapatellar incision and the use of any retractors to retract the surrounding soft tissue may further permit the surgeon to view the surgical area without obstruction from the quadriceps tendon and/or the patella. The improved visibility attributable to the exemplary procedures and patient-specific resection guide locators 50, 80 described herein may further contribute to reduced procedures times compared to prior approaches.

Without being bound by theory, it is further contemplated that the anteromedial flange 25 also permits the surgeon to place a fixation pin 62 or other resection guide fixation means precisely to align the femoral resection guide 90 at the desired position. The use of the four inch medial parapatellar incision permits the surgeon to realize this precision without harming the MCL and without harming the medial condyle from which the MCL originates. Less releasing of natural ligaments can contribute to faster healing and preservation of natural stability structures.

The femoral resection guide 90 has complementary resection guide fixation means configured to engage the femoral resection guide locator fixation means of the anteromedial flange 25.

It will be appreciated that femoral resection guide locator fixation means can include through bores and fixation pins, guide receptacles, clamps, lips, magnets, protrusions, recessions, projection-recession locking mechanisms, and any other structure that can selectively mechanically, magnetically, or electromechanically engage a complementary resection guide fixation means associated with a femoral resection guide 90. Likewise, it will be appreciated that the complementary resection guide fixation means associated with a femoral guide 90 can include through bores and fixation pins, guide receptacles, clamps, lips, magnets, protrusions, recessions, projection-recession locking mechanisms, and any other structure that can selectively mechanically, magnetically, or electromechanically engage the specific femoral resection guide locator fixation means associated with a given femoral resection guide locator 50.

In other exemplary embodiments, the femoral resection guide 90 and the patient-specific femoral resection guide locator 50 can be a continuous unit. That is, the femoral resection guide 90 can be permanently engaged to the patient-specific femoral resection guide locator 50 to define a patient-specific femoral resection guide locator construct. In such embodiments, the femoral resection guide 90 may desirably permanently engage the patient-specific femoral resection guide locator 50 at the anteromedial flange 25. In such exemplary embodiments, the patient-specific femoral resection guide locator construct may be desirably manufactured from cobalt chrome, titanium, or other biocompatible clinically proven material of sufficient strength and durability.

Figure 5:
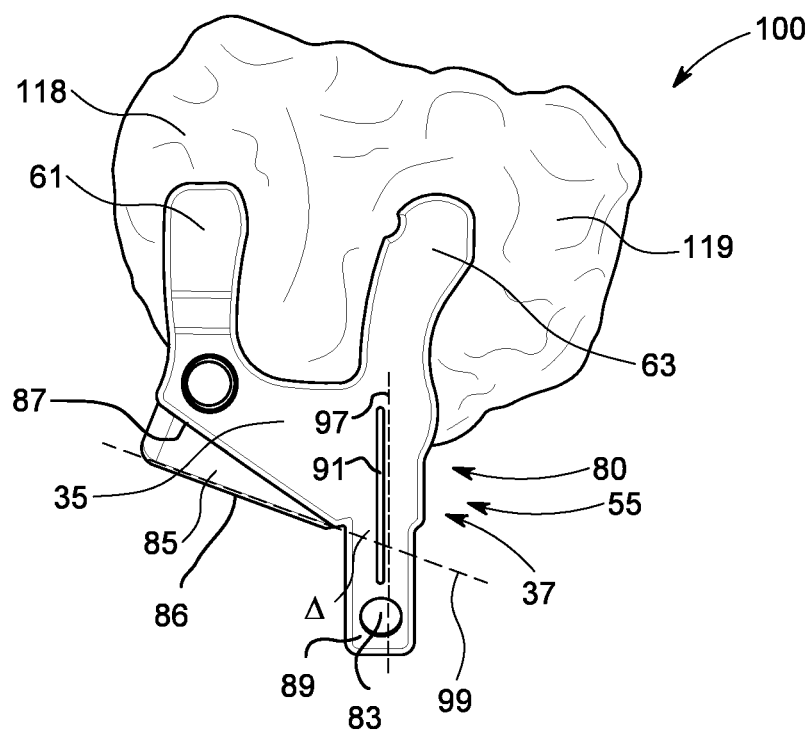
FIG. 5 is a top down view of an exemplary patient-specific tibial resection guide locator engaged to the proximal aspect of an exposed tibia.
Figure 6:
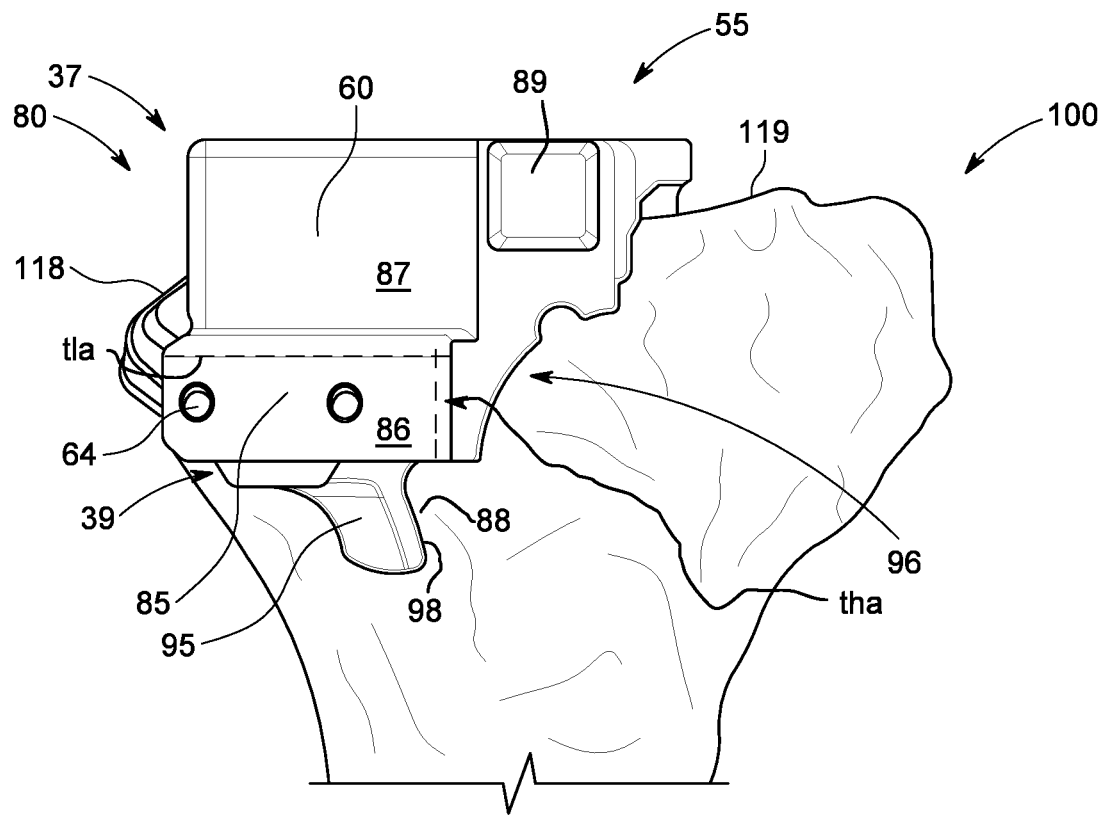
FIG. 6 is an anterior view of the exemplary patient-specific tibial resection guide locator of FIG. 5.
Figure 7:
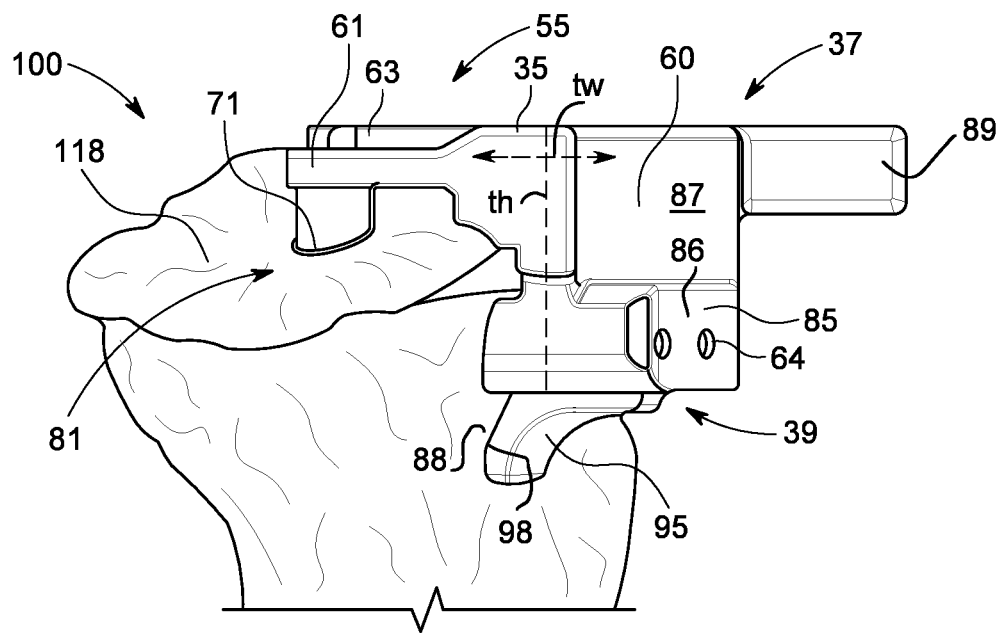
FIG. 7 is a medial view of the exemplary patient-specific tibial resection guide locator of FIGS. 5 and 6.

FIGS. 5-7 generally depict an exemplary embodiment of a patient-specific tibial resection guide locator 80 that is disposed on the proximal aspect of an exposed tibia 100 (i.e., is in an installed configuration). The proximal tibia 100 comprises a medial tibial condyle 118, a tibial lateral condyle 119. It will be appreciated that the exemplary patient-specific tibial resection guide locators 80 described herein can further have an uninstalled configuration, in which the patient-specific tibial resection guide locator 80 is not placed on the proximal tibia 100.

An exemplary patient-specific tibial resection guide locator 80 can comprise a tibial guide body 60 and a first positioning member 55 extending from the tibial guide body 60. In embodiments in which the first positioning member 55 is on a patient-specific tibial resection guide locator 80 (e.g., as shown in FIG. 5), the first positioning member 55 can be known as a "superior positioning member" or a "tibial superior positioning member." In the depicted embodiment, the superior positioning member 55 comprises a superior bifurcated tibial condylar yoke 35 extending from a superior end 37 of the tibial guide body 60. The superior bifurcated tibial condylar yoke 35 has a first tibial arm 61 and a second tibial arm 63. The first tibial arm 61 has a first superior tibial bone engaging surface 71 (FIG. 7) that is configured for complementary matching with a first set of superior anatomical surface features 81 of a selected region of the patient's natural tibia 100. The tibial second arm 63 has a second superior tibial bone engaging surface 72 (FIG. 9B) that is configured for complementary matching with a second set of superior anatomical surface features 82 (FIG. 9B) of a selected region of the patient's natural tibia 100.

A second positioning member 95 extends from an inferior end 39 of the tibial guide body 60. In embodiments in which the second positioning member 95 is on a patient-specific tibial resection guide locator 80 (e.g., as shown in FIG. 6), the second positioning member 95 can be known as an "inferior positioning member" or a "tibial inferior positioning member." The inferior positioning member 95 can further comprise an inferior positioning member first inferior bone engaging surface 98 that is configured for complementary matching with an inferior set of anatomical surface features 88 of a selected region of the patient's natural bone (FIG. 7). It will be appreciated that although having bone engaging surfaces 71, 98 that are configured for matching with complementary topographical anatomical features of the tibia 100 is desirable because it is contemplated that such surfaces may allow a surgeon to seat the exemplary tibial resection guide locator 80 on the proximal tibia 100 in a desired location more precisely and more quickly (compared to bone engaging surfaces 71, 98 that lack patient-specific topographical engagement features), nothing in this disclosure shall be construed to require the bone engaging surfaces 71, 98 to be patient-specific. Non-patient-specific bone engaging surfaces 71, 98 are considered to be within the scope of this disclosure.

A rod holder 89 may optionally extend from the tibial guide body 60 to assist the surgeon in positioning the patient-specific tibial resection guide locator 80 intraoperatively. The depicted embodiment shows the rod holder 89 extending from a generally anterior side of the tibial guide body 60. A surgeon may place a positioning rod (not depicted) through the rod orifice 83 to stabilize the patient-specific tibial resection guide locator 80 in the installed configuration.

A tibial anteromedial flange 85 extends from the tibial guide body 60 between the superior positioning member 55 and the inferior positioning member 95, wherein the tibial anteromedial flange 85 is disposed at an offset angle relative to a tibial reference sagittal plane 97 of the tibial guide body 60. When the offset angle is described with reference to the tibial resection guide locator 80, the offset angle can be known as a "tibial offset angle $\Delta$."

The tibial offset angle Δ is defined by the intersection of a reference tibial reference sagittal plane 97 of the tibial guide body 60 and a tibial reference flange plane 99. The tibial reference flange plane 99 can be imagined to be coplanar with the tibial flange length (tla) and the tibial flange height (tha) of an anterior face 86 of the anteromedial tibial flange 85. Likewise, the tibial reference sagittal plane 97 is disposed co-planar with a height (th) and a width (tw) of the rod holder 89 of the tibial guide body 60. In the depicted embodiment, the tibial reference sagittal plane 97 is shown adjacent to a marker 91 that a surgeon may use to visually align the tibial resection guide locator 80 with the proximal tibia 100. The marker 91 is shown generally perpendicular to the mechanical axis of the tibia 100.

The rod holder 89 preferably extends from the tibial guide body 60 away from the anterior side of the tibial guide body 60 when the exemplary tibial guide locator 80 is disposed in the installed configuration. The rod holder 89 preferably extends linearly away from the anterior side of the tibial guide body 60 such the rod orifice 83 is anteriorly align with the mechanical axis of the patient's knee when the patient-specific tibial resection guide locator 80 is disposed in the installed configuration. If desired, the surgeon can place an alignment rod through the rod orifice 83 to visually verify the slope of the tibial resection guide locator 80 relative to the mechanical axis. In many procedures, the slope will be zero degrees, i.e., the alignment rod will be disposed parallel to the mechanical axis. Such and alignment confirms that the placement of the pins 62 and by extension, the eventual position of the resection slot 36 is perpendicular to the mechanical axis, thereby permitting a perpendicular tibial resection relative to the mechanical axis.

It will be understood that the tibial reference flange plane 99 and the tibial reference sagittal plane 97 are imaginary planes that can be imagined to reference their corresponding elements as described. In the depicted embodiment, the anteromedial tibial flange 85 comprises a first set of through bores 64 for fixation pins 62.

In certain exemplary embodiments, the tibial offset angle Δ can be selected from a range of values between (and including) about 60° to about 120° and preferably between about 70° to about 110°. It will be appreciated that the exact value of the tibial offset angle Δ can be determined based on the patient's specific anatomy that is desirably assessed from preoperative imaging data. Without being bound by theory, it is contemplated that a tibial resection guide locator 80 having a tibial anteromedial flange 85 disposed at a tibial offset angle Δ selected from a value within either of these exemplary ranges may permit the placement of a resection guide 75 and ultimately allow for the resection of the tibia more medially that was previously possible while using a substantially smaller incision compared to conventional hip arthroplasty techniques that utilize a six to eight inch incision.

In embodiments, the anteromedial tibial flange 85 can be a modular piece that is selectively removable from the tibial body 60 of the tibial resection guide locator 80. It is contemplated that having a modular anteromedial tibial flange 85 may permit surgeons to adjust the tibial offset angle Δ to better access the proximal tibia 100 through the smaller incision of a minimally invasive procedure. It is contemplated that the anteromedial tibial flange 85 may be selectively or removably engaged to the tibial body 60 of the tibial resection guide locator 80 by complementary protrusions and recessions, such as rails, or any of the other "fixation means" disclosed herein.

In the installed configuration, the tibial anteromedial flange 85 is desirably disposed on the medial side of the proximal tibia 100 to align with the minimally invasive three to four inch incision that is located more medially on the patient's knee compared to the location of the incision on more traditional knee arthroplasties. In other exemplary embodiments, the anteromedial tibial flange 85 comprises a guide receptacle. In other exemplary embodiments, the anteromedial tibial flange 85 can comprise multiple sets of fixation pin through bores 64a, 64b, 64c wherein a superior set of fixation pin through bores 64a is disposed superior to an initial set of fixation pin through bores 64c. An inferior set of fixation pin through bores 64b is disposed inferior to the initial set of fixation pin through bores 64c. The inferior set of fixation pin through bores 64b may be spaced such that they provide an extra 2 millimeters ("mm") of resection relative to the superior set of fixation pin through bores 64a (see FIG. 9C). Still other exemplary embodiments may comprise only two sets of fixation pin through bores 64a, 64b or more than three sets of fixation pin through bores.

As best seen in FIG. 6, the exemplary patient-specific tibial resection guide locator 80 desirably comprises a curved tuberosity side 96 disposed between the superior end 37 and the inferior end 39 of the tibial guide body 60 at the posterior end of the resection guide locator 80. The curved tuberosity side 96 allows the patient-specific tibial resection guide locator 80 to be fitted around the patellar tendon in an installed configuration, which is disposed much closer to its natural position in a minimally invasive procedure as compared to a standard procedure. The curved tuberosity side 96 is desirably configured for complementary matching with the surface topography of the patient's particular tuberosity of the operative tibia. It will be appreciated that the exemplary patient-specific tibial resection guide locators 80 described herein can further have an uninstalled configuration, in which the patient-specific tibial resection guide locator 80 is not placed on the proximal tibia 100.

In exemplary embodiments, the tibial resection guide locator 80 can be manufactured from biocompatible medical grade polyamide. Such polyamides can include nylon biocompatible medical grade polyamides for example. In other embodiments, the femoral resection guide locator 50 can be manufactured from other clinically proven biocompatible materials, such as cobalt chrome, or titanium.

Figure 8:
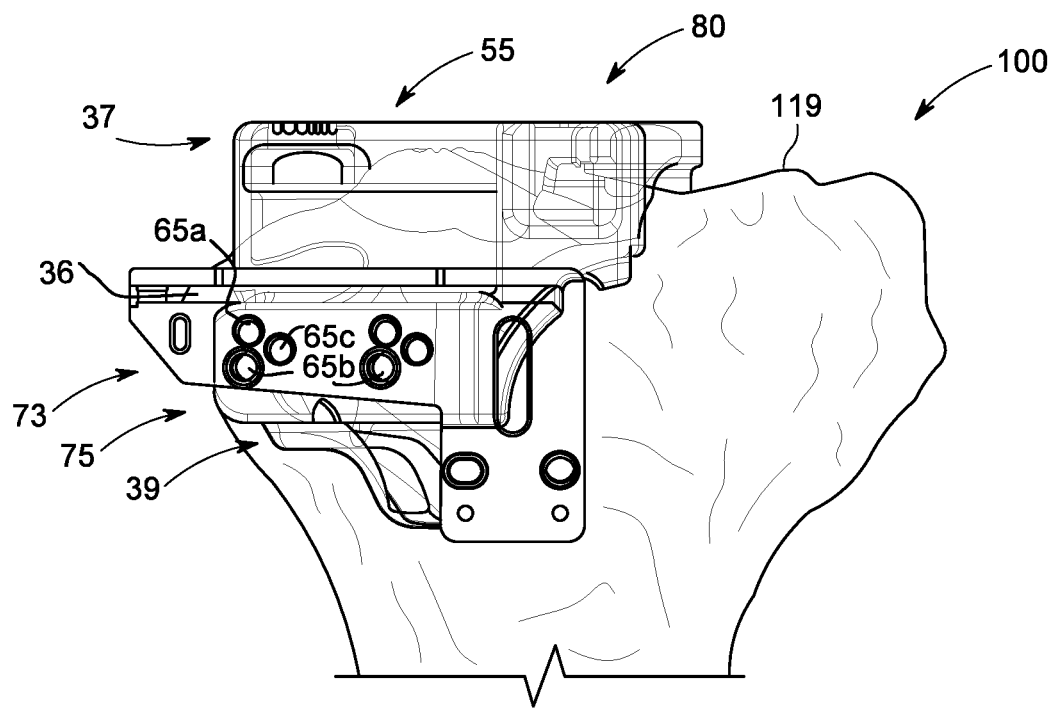
FIG. 8 is an anterior view of an exemplary patient-specific tibial resection guide locator assembly engaged to the proximal aspect of the exposed tibia.

FIG. 8 shows the exemplary patient-specific tibial resection guide locator 80 in phantom and a tibial resection guide 75 aligned with bore holes that were created through drill bits inserted through the fixation pin through bores 64. When present together, the patient-specific tibial resection guide locator 80 and the tibial resection guide 75 may me known as a "tibial resection guide assembly" 73. In practice, the tibial resection guide locator 80 is seated on the proximal tibia 100 (in an installed configuration) in much the same manner as described above with reference to the femoral resection guide locator 50, namely, the bone engaging surfaces 71, 98 are disposed on the surface of the proximal tibia 100 to place the tibial resection guide locator 80 in an installed configuration. The tibial resection guide 75 has complementary tibial resection guide fixation means configured to engage the tibial resection guide locator fixation means of the tibial anteromedial flange 85.

It will be appreciated that tibial resection guide locator fixation means can include through bores and fixation pins, guide receptacles, clamps, lips, magnets, protrusions, recessions, projection-recession locking mechanisms, and any other structure that can selectively mechanically, magnetically, or electromechanically engage a complementary tibial resection guide fixation means associated with a tibial resection guide 75. Likewise, it will be appreciated that the complementary tibial resection guide fixation means can include through bores and fixation pins, guide receptacles, clamps, lips, magnets, protrusions, recessions, projection-recession locking mechanisms, and any other structure that can selectively mechanically, magnetically, or electromechanically engage the specific tibial resection guide locator fixation means associated with a given tibial resection guide locator 80.

In the depicted embodiment, these means are fixation pins 62 and through bores 64, 65. Once seated, fixation pins (see 62, FIGS. 9A, 9B) can be inserted into the proximal tibia 100 and the tibial resection guide locator 80 can then be removed. The tibial resection guide 75 can then be slid over the fixation pins 62 to orient the resection slot 36 of the resection guide 75 in the optimal position for tibial resection.

The depicted tibial resection guide 75 further comprises three sets of tibial resection guide through bores 65a, 65b, 65c. The initial through bores 65c are shown in the middle of the tibial resection guide 75 relative to the other through bores. When the tibial resection guide 75 is placed over fixation pins 62 using the initial through bores 65c, the resection slot 36 is positioned relative to the tibia 100 at a height that corresponds to the size of a particular endoprosthetic knee implant assembly. For example, the height of a standard endoprosthetic knee implant assembly may be 10 mm. In this example, a resection of the distal femur 200 using a femoral resection guide 90 and a resection of the proximal tibia 100 using the tibial resection guide 75 with its resection slot 36 oriented relative to the tibia 100 using the initial through bores 65c would create a 10 mm gap between the resected distal femur 200 in extension and the resected proximal tibia 100 that would be sufficient to accommodate the 10 mm endoprosthetic knee implant assembly.

However, a variety of factors may motivate a surgeon to resect more or less of the proximal tibia 100, and thereby adjust the height of the gap between the resected distal femur 200 and the resected proximal tibia 100. Such factors may include the health and integrity of the underlying bone and the available implant sizes. If the surgeon concludes that less tibial bone can be taken, the surgeon may ultimately elect to place the tibial resection guide 75 over the inserted fixation pins 62 using the inferior tibial resection guide through bores 65b. In the depicted embodiment, these inferior through bores 65b are located in a line under the initial through bores 65c and the superior through bores 65a. If the fixation pins 62 are placed through the inferior through bores 65b, the position of the resection slot 36 is shifted upwardly relative to where the resection slot would have been if the initial through bores 65c were used. If the inferior through bores 65b are disposed 2 mm below the initial through bores 65c for example, the resection slot 36 will be disposed 2 mm above where it would have been had the tibial resection guide 75 been placed using the initial through bores 65c. As such, a surgical saw placed through the newly oriented resection slot 36 (i.e., placed using the inferior through bores 65b) will resect 2 mm less bone than had the tibial resection guide 75 been placed using the initial through bores 65c.

Conversely, if the tibial resection guide 75 is placed adjacent to the tibia 100 using the superior through bores 65a, the resection slot 36 will be disposed lower along the height of the tibia 100 compared to the position the resection slot 36 would have been in had the tibial resection guide 75 been placed adjacent to the tibia 100 by sliding the tibial resection guide 75 over the embedded fixation pins 62 using the initial through bores 65c. If the superior through bores 65a were disposed 2 mm above the initial through bores 65c for example, a surgeon would end up resecting 2 mm more of bone using the superior through bores 65a compared to the initial through bores 65c.

In other exemplary embodiments, the tibial resection guide 75 and the patient-specific tibial resection guide locator 80 can be a continuous unit (see FIG. 9C). That is, in some embodiments, the tibial resection guide 75 can be permanently engaged to the patient-specific tibial resection guide locator 80 to define a patient-specific tibial resection guide locator construct. In such embodiments, the tibial resection guide 75 may desirably permanently engage the patient-specific tibial resection guide locator 80 at the tibial anteromedial flange 85. In such exemplary embodiments, the patient-specific tibial resection guide locator construct may be desirably manufactured from cobalt chrome, titanium, or other biocompatible clinically proven material of sufficient strength and durability. In other exemplary embodiments in which an exemplary patient-specific tibial resection guide locator 80 effectively comprises a tibial resection guide 75, the tibial resection guide locator 80 can simply comprise a resection slot 36 extending through the tibial guide body 60 (see FIG. 9B).

Without being bound by theory, it is contemplated that exemplary patient-specific tibial resection guide locators 80 having a tibial anteromedial flange 85 disposed at a tibial offset angle $\Delta$ results in a more compact design compared to existing resection guide locators. This compact design, and the patient-specific bone engaging surfaces (e.g., 71, 72, 95, and 98) may allow the surgeon to access the operative area through the reduced surgical aperture and be confident that the patient-specific tibial resection guide locator 80 is properly positioned relative to the patient when the bone engaging surfaces (e.g., 71, 72, and 98) engage their complementary anatomical surfaces features on the patient's bone (e.g., 81, 82, and 88 respectively).

Without being bound by theory, it is further contemplated that the tibial anteromedial flange 85 also permits the surgeon to place a fixation pin 62 or other resection guide fixation means precisely to align the tibial resection guide 75 at the desired position. The use of the four inch medial parapatellar incision permits the surgeon to realize this precision without harming the MCL and without harming the tibial medial condyle from which the MCL originates. Less releasing of natural ligaments can contribute to faster healing and preservation of natural stability structures.

It will be appreciated that the exemplary femoral and tibial resection guide locators 50, 80 disclosed herein may have chamfered or rounded edges to further minimize the profile of the exemplary instruments and to reduce the likelihood inadvertent cutting of soft tissue that sharp edges may otherwise create.

Figure 9A:
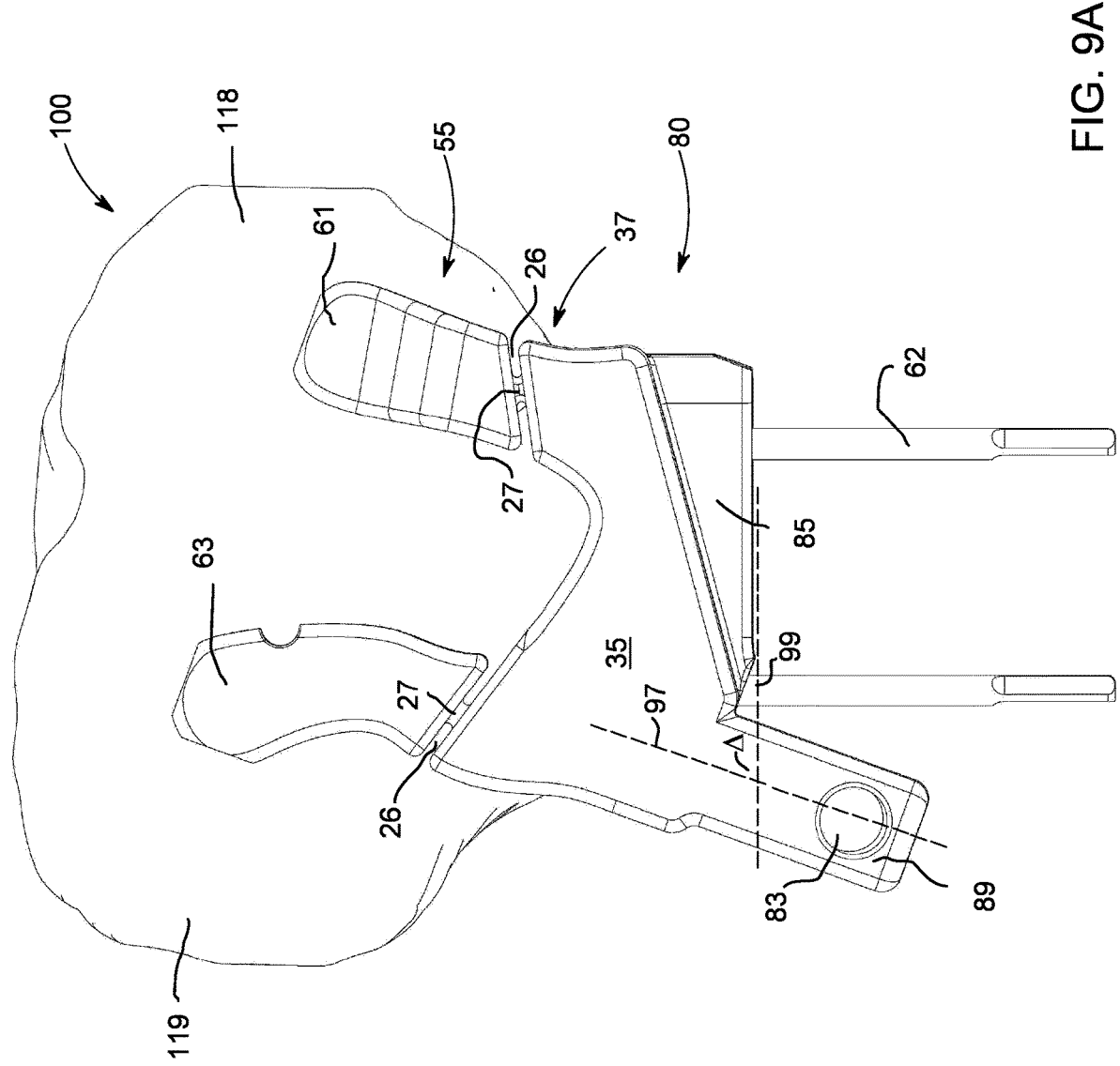
FIG. 9A is a top down view of an exemplary embodiment of a patient-specific tibial resection guide locator engaged to the proximal aspect of an exposed tibia, wherein the tibial resection guide locator comprises breakaway positioning members.

FIG. 9A is a top down view of an exemplary embodiment of a patient-specific tibial resection guide locator 80 engaged to the proximal aspect of an exposed tibia 100, wherein the tibial resection guide locator 80 comprises breakaway positioning members 61, 63. Similar to the exemplary embodiment depicted in FIGS. 5-8, the depicted patient-specific tibial resection guide locator 80 of FIGS. 9A-9E comprises a superior positioning member 55 extending from a superior end 37 of the tibial guide body 60. The superior positioning member 55 comprises a bifurcated condylar yoke 35 having a breakaway first tibial arm 61 and a breakaway second tibial arm 63 that is spaced apart from the first tibial arm 61. The first tibial arm 61 has a first superior tibial bone engaging surface 71 (FIG. 9C) that is configured for complementary matching with a first set of superior anatomical surface features 81 of a selected region of the patient's natural tibia 100. The tibial second arm 63 has a second superior tibial bone engaging surface 72 (FIG. 9C) that is configured for complementary matching with a second set of superior anatomical surface features 82 of a selected region of the patient's natural tibia 100.

Figure 9B:
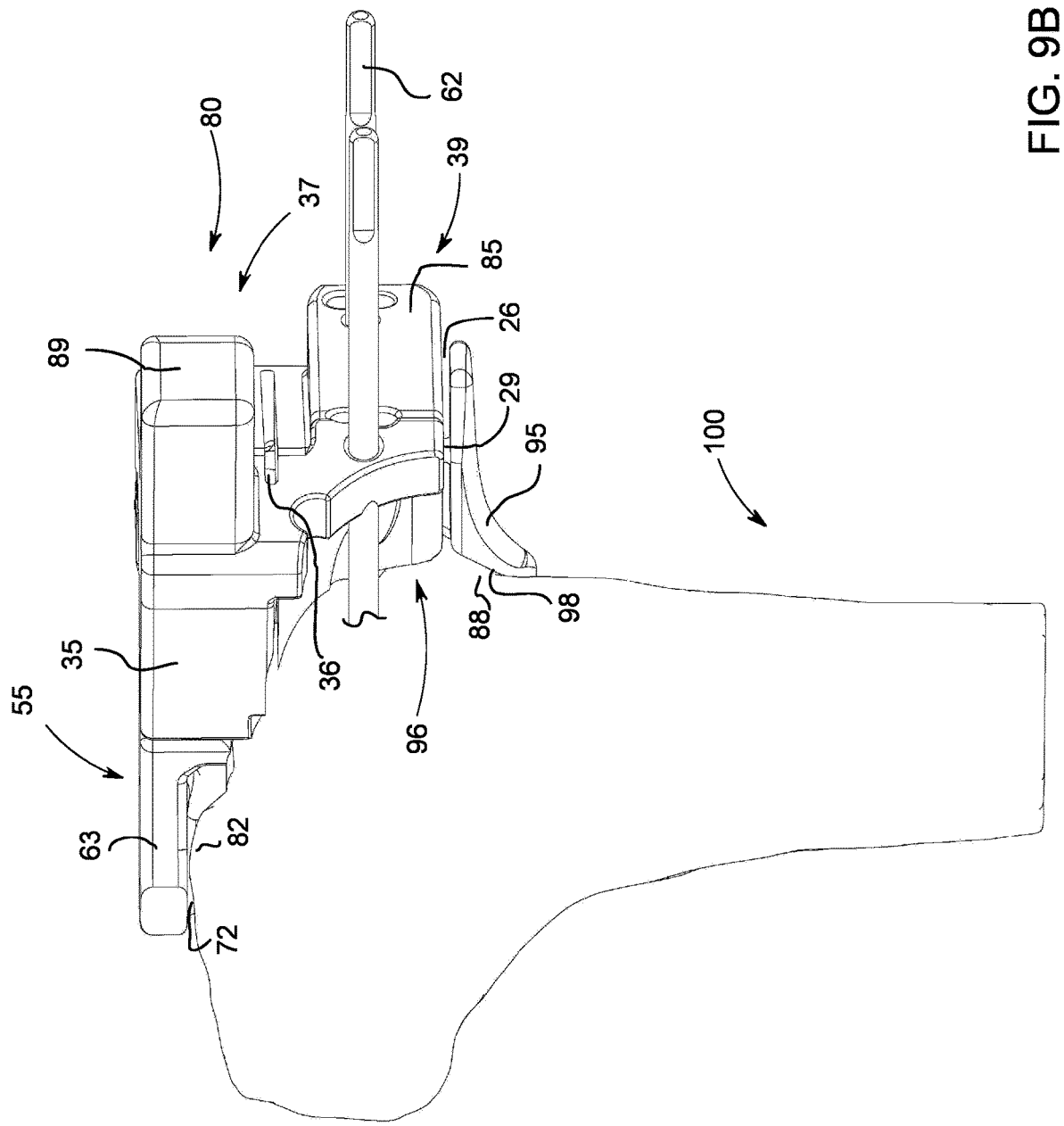
FIG. 9B is a medial view of the exemplary patient-specific tibial resection guide locator of FIG. 9A.
Figure 9E:
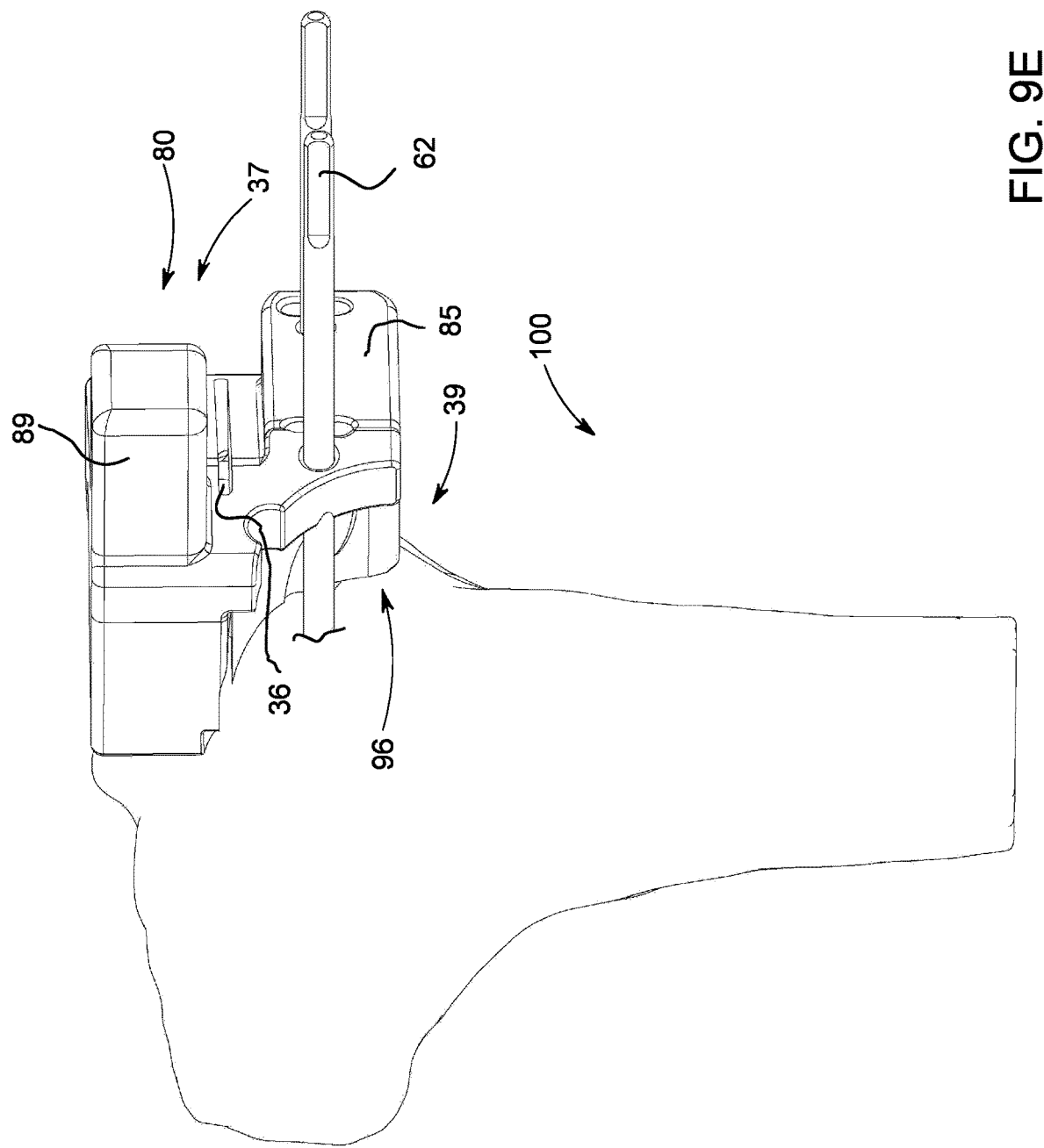
FIG. 9E is a medial view of the exemplary patient-specific tibial resection guide locator of FIGS. 9A, 9B, 9C and 9D.

An annular recession 26 is disposed between a proximal end of each tibial arm 61, 63 to define a superior narrow bridge 27 extending between the proximal end of each tibial arm 61 and a distal end of the superior end 37 of the tibial guide body 60. Likewise, an annular recession is disposed around an inferior positioning member 95 to define an inferior narrow bridge 29 connecting the inferior end 39 of the tibial guide body 60 to the inferior positioning member 95. The breakaway inferior positioning member 95 may comprise an inferior positioning member first inferior bone engaging surface 98 that is configured for complementary matching with an inferior set of anatomical surface features 88 of a selected region of the patient's natural bone (FIG. 9B).

It is contemplated that embodiments that comprise breakaway positioning members could be used more frequently when the tibial resection guide locator 80 is manufactured from a biocompatible medical grade polyamide because such polyamides are generally less resilient to shear and torsional forces at the narrow bridges 29, 27, especially when compared to metals such as cobalt chrome, or titanium. However, nothing in this disclosure should be construed to prevent the use of the breakaway positioning members with cobalt chrome or titanium. It is further contemplated that in exemplary embodiments that do have breakaway positioning members and in which the tibial resection guide locator 80 is manufactured from a durable biocompatible material such as cobalt chrome, or titanium, the narrow bridges 29, 27 can desirably be manufactured from a medical grade polyamide or other biocompatible material that is less resilient to shear and torsional forces than the metal. In such exemplary embodiments, the narrow bridges 29, 27 can be bonded to the tibial guide body 60 of the tibial resection guide locator 80 and the positioning members 55, 95 prior to the tibial resection guide locator 80 being introduced into the minimally invasive incision.

The anterior face 86 of the anteromedial tibial flange 85 is disposed at a tibial offset angle Δ relative to the tibial reference sagittal plane 97 of the tibial guide body 60 of the tibial resection guide locator 60. To save space and material, the anterior face 87 of the tibial guide body 60 can be recessed from the anterior face 86 of the anteromedial tibial flange 85. In the embodiment depicted in FIGS. 9A-9E, the tibial body 60 further defines a resection slot 36 for a surgical saw. That is, whereas the embodiment shown in FIG. 8 depicted the patient-specific tibial resection guide locator 80 and the tibial resection guide 75 as separate instruments, the functionality of both instruments has been combined in the embodiments depicted in FIGS. 9A-9E. As such, multiple through bores 64*a*, 64*b*, 64*c* are provided (FIG. 9C). These multiple through bores 64*a*, 64*b*, 64*c* extend from the anterior face 86 of the anteromedial tibial flange 85 through the anteromedial tibial flange 85 and tibial guide body 60 to the curved tuberosity side 96 of the patient-specific tibial resection guide locator 80.

The initial through bores 64*c* are placed at a height along the anteromedial tibial flange 85 that is between the placement height of the other through bores. The superior through bores 64*a* are disposed above the initial through bores 64*c* when the exemplary tibial resection guide locator 80 is in the installed configuration. Likewise, the inferior through bores 64*b* are disposed below the initial through bores 64*c* when the exemplary tibial resection guide locator 80 is in the installed configuration.

In operation, the surgeon may place the exemplary patient-specific tibial resection guide locator 80 in the installed configuration to seat the patient-specific tibial resection guide locator 80 at the desired location that was determined preoperatively. The surgeon can then insert the fixation pins 62 through the initial through bores 64*c* to further engage the patient-specific tibial resection guide locator 80 to the proximal tibia 100. Preoperative plans can be incredibly helpful for the planning and execution knee arthroplasties, but they cannot account for every variable that a patient may experience between the preoperative imaging session and the date of the procedure. If the surgeon determines intraoperatively that adjustments to the placement of tibia resection are desirable, the surgeon may then break the superior and inferior narrow bridges 27, 29 to remove the superior and inferior positioning members 55, 95 (and thereby the patient-specific engagement surfaces 71, 72, 98, which provided initial anchoring forces) from the tibial resection guide locator 80.

As a result, the curved tuberosity side 96 of the patient-specific tibial resection guide locator 80 may still be disposed on the tuberosity, but the fixation pins 62 extending through the initial through bores 64*c* are now the primary elements that are securing the tibial resection guide locator 80 to the tibia 100 at the precise location set by the now removed superior and inferior positioning members 55, 95. If the surgeon would like to resect less of the tibia 100, the surgeon can slide the tibial resection guide locator 80 off of the fixation pins 62 and then slide the tibial resection guide locator 80 back onto the fixation pins 62 using the inferior through bores 64*b*. The effect of this repositioning is that the resection slot 36 is now disposed above where the resection slot 36 was initially placed using the initial through bores 64*c*. Conversely, if the surgeon would like to resect more of the tibia 100, the surgeon can slide the tibial resection guide locator 80 off of the fixation pins 62 and then slide the tibial resection guide locator 80 back onto the fixation pins 62 using the superior through bores 64*a*. With this repositioning, the resection slot 36 is now disposed lower on the tibia 100 than it was using the initial through bores 64*c*. A surgical saw inserted through the resection slot 36 at this adjusted height will cause the surgeon to resect more bone.

Once the surgeon is satisfied with the placement of the resection slot 36, the surgeon may insert a surgical saw through the resection slot 36 to resect the desired amount of the proximal tibia 100.

The precise height of the superior through bores 64*a* and inferior through bores 64*b* can vary based on implant design and associated sizing instrumentation. In one exemplary embodiment, the superior through bores 64*a* can be placed at +2 mm from the initial through bores 64*c* and the inferior through bores 64*b* can be placed at −2 mm from the initial through bores 64*c*.

FIG. 10A is a top down view of an exemplary embodiment of a patient-specific tibial resection guide locator 80 engaged to the proximal aspect of an exposed tibia 100, wherein the tibial resection guide locator 80 comprises a single superior positioning member 55*a*.

In the depicted embodiment, the single superior positioning member 55*a* comprises a first tibial arm 61. The first tibial arm 61 has a first superior bone engaging surface 71 (FIG. 10B) that is configured for complementary matching with a first set of superior anatomical surface features 81 of a selected region of the patient's natural bone. In the depicted installed configuration, the first superior bone engaging surface 71 of the single superior positioning member 55a is disposed adjacent to complementary anatomical surface features 81 on the medial tibial condyle 118. However, in other exemplary embodiments, the first superior bone engaging surface 71 of the single superior positioning member 55a can be disposed adjacent to complementary anatomical surface features 81 on the lateral tibial condyle 119. In still other exemplary embodiments, a single wide superior positioning member 55a can be used in lieu of a bifurcated condylar yoke (see 35) such that the single wide superior positioning member 55a covers a least a portion of the medial tibial condyle 118 and lateral tibial condyle 119 in an installed configuration.

Figure 10B:
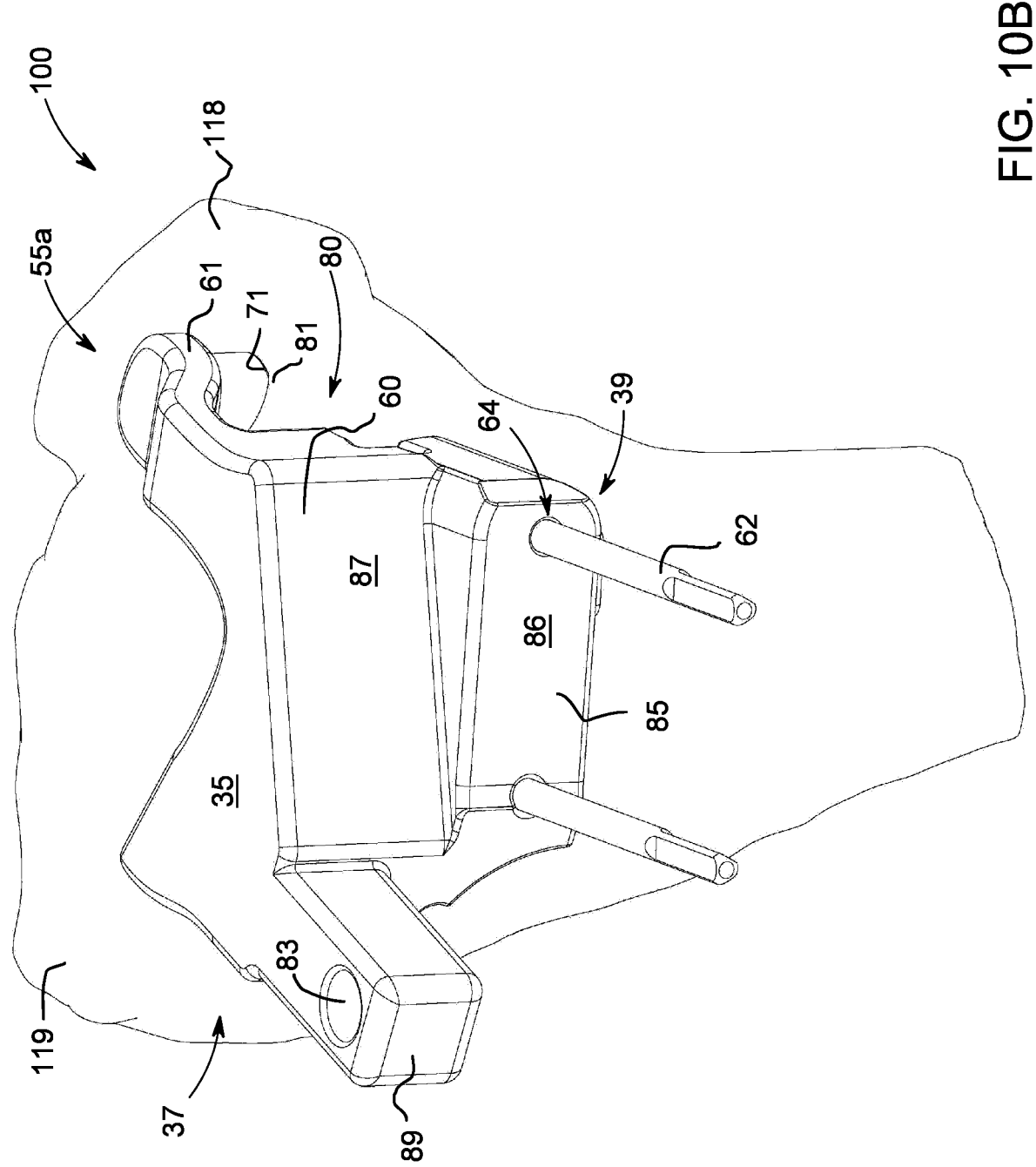
FIG. 10B is a perspective view of the exemplary embodiment of FIG. 10A.

FIG. 10B is a perspective view of the exemplary embodiment of FIG. 10A.

Without being bound by theory, it is further contemplated that the single superior positioning member 55a can further reduce the profile of the exemplary patient-specific tibial resection guide locator 80 while still permitting the first superior bone engaging surface 71 and a first inferior bone engaging surface 98 (see FIG. 9B) to engage complementary anatomical surface features of selected regions of the patient's natural bone (81 and 88 respectively, see FIGS. 9B and 9C). In this manner, it is contemplated that the depicted exemplary tibia resection guide locator 80 can further facilitate ease of installation and use in minimally invasive knee arthroplasties. It is further contemplated that an exemplary tibial resection guide 80 having a single superior positioning member 55a with a first superior bone engaging surface 71 may be well suited for a unicondylar knee arthroplasty. For any intended use, it is contemplated that less time and resources may be called upon to design and manufacture such an exemplary embodiment.

Figure 11A:
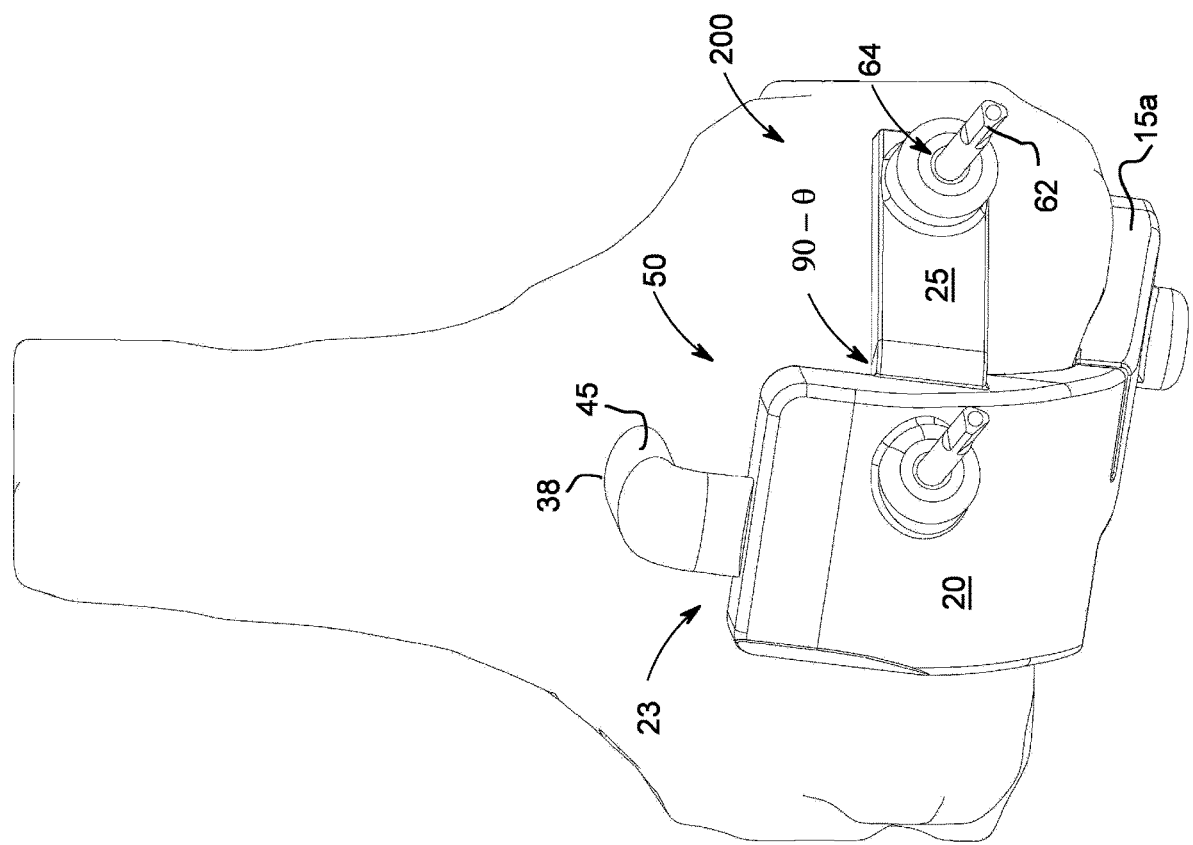
FIG. 11A is an anterior view of an exemplary patient-specific femoral resection guide locator engaged to the distal aspect of an exposed femur in extension, wherein the patient-specific femoral resection guide locator comprises a single inferior positioning member.
Figure 11B:
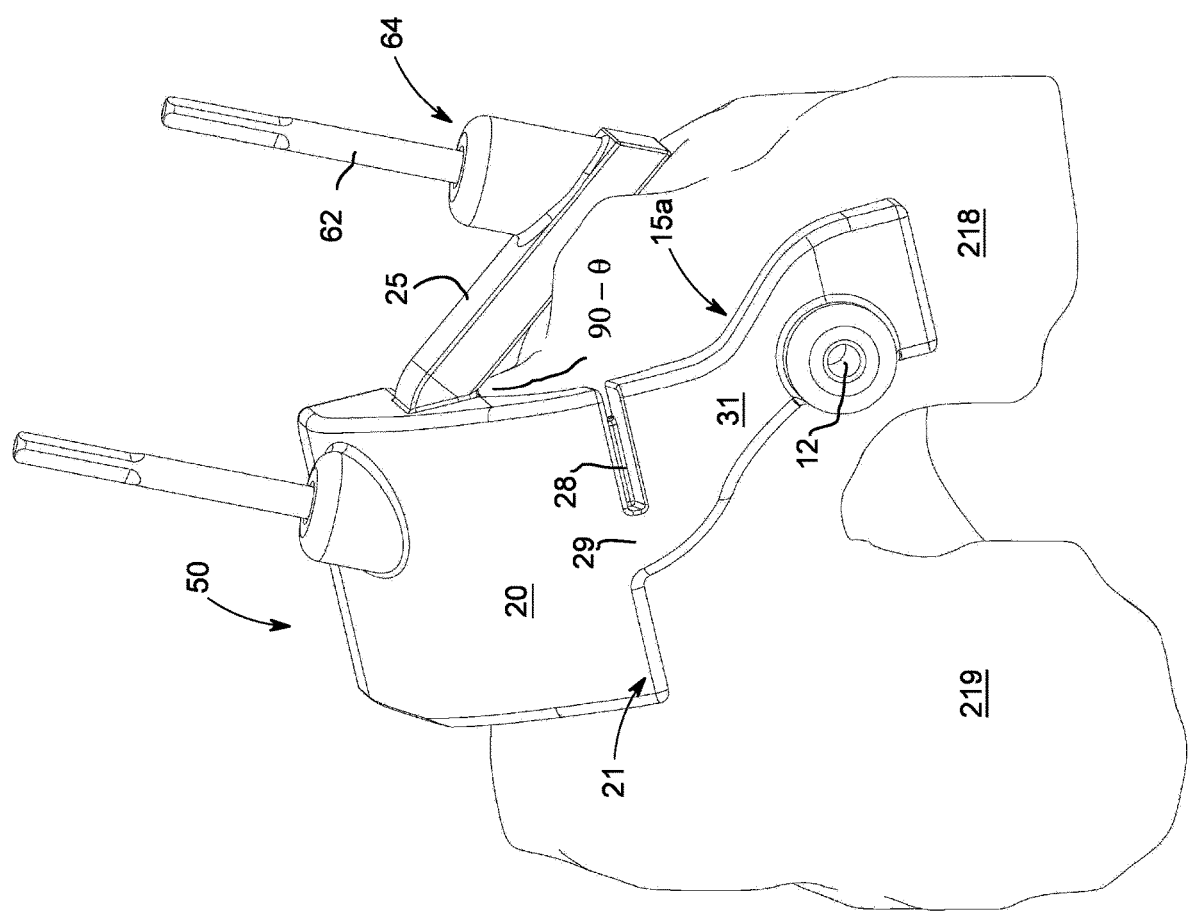
FIG. 11B is an anterior view of the exemplary embodiment depicted in FIG. 11A.

FIG. 11A is an anterior view of an exemplary patient-specific femoral resection guide locator 50 engaged to the distal aspect of an exposed femur 200 in extension, wherein the patient-specific femoral resection guide locator 50 comprises an anteromedial flange 25 disposed at a femoral offset angle θ (the complementary femoral offset angle 90−θ is depicted for ease of reference; it will be understood that were a complementary femoral offset angle 90−θ exists, a femoral offset angle necessarily exists), and a single inferior positioning member 15 (FIG. 11B). In FIG. 11B, the exemplary patient-specific femoral resection guide locator 50 is shown engaged to the distal aspect of an exposed femur 200 in extension.

In the depicted embodiment, the single inferior positioning member 15a comprises a first arm 31. The first arm 31 has a first inferior bone engaging surface 32 (see FIG. 2) that is configured for complementary matching with a first set of inferior anatomical surface features 42 (see FIG. 2) of a selected region of the patient's natural bone. In the depicted installed configuration, the first bone engaging surface 32 of the single inferior positioning member 15a is disposed adjacent to complementary anatomical surface features 42 on the medial condyle 218 of the distal femur 200. However, in other exemplary embodiments, the first bone engaging surface 32 of the single inferior positioning member 15a can be disposed adjacent to complementary anatomical surface features 42 on the lateral condyle 219 of the distal femur 200. In still other exemplary embodiments, a single wide inferior positioning member 15a can be used in lieu of a bifurcated condylar yoke (see 35) such that the single wide inferior positioning member 15a covers a least a portion of the medial condyle 218 and lateral condyle 219 in an installed configuration.

Without being bound by theory, it is further contemplated that the single inferior positioning member 15 can further reduce the profile of the exemplary patient-specific femoral resection guide locator 50 while still permitting the first inferior bone engaging surface 32 (see FIG. 2) and a first superior bone engaging surface 38 (see FIG. 2) to engage complementary anatomical surface features of selected regions of the patient's natural bone (42 and 48 respectively, see FIG. 2). In this manner, it is contemplated that the depicted exemplary femoral resection guide 50 can further facilitate ease of installation and use with minimally invasive knee arthroplasties. It is further contemplated that an exemplary femoral resection guide 50 having a single inferior positioning member 15 with a first inferior bone engaging surface 32 may be well suited for a unicondylar knee arthroplasty. For any intended use, it is contemplated that less time and resources may be called upon to design and manufacture such an exemplary embodiment.

Although FIG. 11B further depicts a recess 28 disposed at an inferior end 21 of the body 20 of the patient-specific femoral resection guide 50 to define an inferior narrow bridge 29, which thereby defines a breakaway inferior positioning member 15, it will be appreciated that in other exemplary embodiments, the recess 28 may be absent. Likewise, the superior positioning member 45 may further comprise an annular recession 26 disposed between the superior end 23 of the body 20 and the superior positioning member 45 to define a superior narrow bridge 27 in certain exemplary embodiments.

It is contemplated that the exemplary patient-specific femoral resection guides 50 and the exemplary patient-specific tibial resection guides 80 described herein can be produced in any number of manufacturing methods including for example, stereo lithography, selective laser sintering, fused deposition modeling, or other types of additive manufacturing techniques.

The components of the exemplary patient-specific femoral resection guide locator assembly 70 can be provided in the form of a surgical kit. Likewise, the components of the exemplary patient-specific tibial resection guide locator assembly 73 can be provided in the form of a surgical kit. The components of the kit are preferably arranged in a convenient format, such as in a surgical tray or case. However, the kit components do not have to be packaged or delivered together, provided that they are assembled or collected together in the operating room for use at the time of surgery. Exemplary kits may include any suitable embodiment of a patient-specific femoral resection guide locator 50, variations of the patient-specific femoral resection guide locators 50 described herein, and any other patient-specific femoral resection guide locators 50 according to an embodiment. While it is contemplated that an exemplary kit may further include one or more femoral resection guide locator fixation means, one or more distal resection guides 90, one or more patient-specific tibial resection guide locators 80, and one or more tibial resection guides 75, it will be appreciated that certain kits may lack some or all of these elements. Any suitable embodiment of a resection guide fixation mean, variations of the resection guide fixation means described herein, and any other resection guide fixation means according to an embodiment are considered to be within the scope of this disclosure. Any suitable embodiment of a distal resection guide 90, variations of the distal resection guides 90 described herein, and any other distal resection guide 90 according to an embodiment are considered to be within the scope of this disclosure. Any suitable embodiment of a patient-specific tibial resection guide locator 80, variations of the patient-specific tibial resection guide locators 80 described herein, and any other patient-specific tibial resection guide locators 80 according to an embodiment are considered to be within the scope of this disclosure. Any suitable embodiment of a tibial resection guide 75, variations of the tibial resection guides 75 described herein, and any other tibial resection guides 75 according to an embodiment are considered to be within the scope of this disclosure.

Selection of a suitable number or type of patient-specific femoral resection guide locator 50, resection guide fixation means, distal resection guide 90, patient-specific tibial resection guide locator 80, and tibial resection guide 75, to include in a kit according to a particular embodiment can be based on various considerations, such as the procedure intended to be performed using the components included in the kit.

An exemplary patient-specific resection guide locator comprises: a body; a first positioning member extending from the body, the first positioning member having a bone engaging surface disposed on a side of the first positioning member, the bone engaging surface being configured for complementary matching with a set of anatomical surface features of a selected region of the patient's natural bone; a second positioning member extending from the body, the second positioning member being distally disposed from the first positioning member; and an anteromedial flange extending from the body between the first positioning member and the second positioning member, wherein the anteromedial flange is disposed at an offset angle relative to a reference sagittal plane of the body, the reference sagittal plane of the body being disposed coplanar with a height and width of the body at a location wherein a reference flange plane intersects the reference sagittal plane, the reference flange plane being coplanar with a flange length and a flange height of the anteromedial flange.

An exemplary patient-specific resection guide locator comprises: a body; a first positioning member comprising a bifurcated condylar yoke extending from the body, the bifurcated condylar yoke having a first arm and a second arm, the first arm having a first bone engaging surface disposed on a side of the first positioning member, the first bone engaging surface being configured for complementary matching with a first set of anatomical surface features of a first selected region of the patient's natural bone, the second arm having a second bone engaging surface disposed on a side of the second positioning member, the second bone engaging surface being configured for complementary matching with a second set of anatomical surface features of a second selected region of the patient's natural bone; a second positioning member extending from the body; and an anteromedial flange extending from the body between the first positioning member and the second positioning member, wherein the anteromedial flange is disposed at an offset angle relative to a reference sagittal plane of the body, the reference sagittal plane of the body being disposed coplanar with a height and width of the body at a location wherein a reference flange plane intersects the reference sagittal plane, the reference flange plane being coplanar with a flange length and a flange height of the anteromedial flange.

In any such exemplary patient-specific resection guide locator, the anteromedial flange can have areas defining fixation pin through bores.

In any such exemplary patient-specific resection guide locator, the anteromedial flange can have areas defining a guide receptacle.

In any such exemplary patient-specific resection guide locator, the first positioning member can be a breakaway positioning member.

In any such exemplary patient-specific resection guide locator, the second positioning member can be a breakaway positioning member.

In any such exemplary patient-specific resection guide locator, the body can have areas defining a resection slot extending through the width of the body.

In any such exemplary patient-specific resection guide locator, the body has a posterior side when disposed in an installed configuration, and the posterior side is configured for complementary matching with an additional set of anatomical surface features of a selected region of the patient's natural bone.

In any such exemplary patient-specific resection guide locator, the anteromedial flange is modular and removably engaged to the body.

In any such exemplary patient-specific resection guide locator, the patient-specific resection guide locator can further comprise rounded or chamfered edges at corners of the body and the first positioning member or the second positioning member.

An exemplary patient-specific femoral resection guide locator comprises: a body; an inferior positioning member extending from an inferior end of the body, the inferior positioning member comprising a bifurcated condylar yoke extending from an inferior end of the body, the inferior bifurcated condylar yoke having a first arm and a second arm, the first arm having a first inferior bone engaging surface disposed on a side of the first arm, the first inferior bone engaging surface being configured for complementary matching with a first set of inferior anatomical surface features of a selected region of the patient's natural bone, the second arm having a second inferior bone engaging surface disposed on a side of the second arm, the second inferior bone engaging surface being configured for complementary matching with a second set of inferior anatomical surface features of a selected region of the patient's natural bone; a superior positioning member extending from a superior end of the body; and an anteromedial flange extending from the body between the inferior positioning member and the superior positioning member, wherein the anteromedial flange is disposed at an offset angle relative to a femoral reference sagittal plane of the body, the femoral reference sagittal plane of the body being disposed coplanar with a height and width of the body at a location wherein the anteromedial flange abuts the body.

An exemplary patient-specific femoral resection guide locator assembly comprises: a patient-specific femoral resection guide locator comprising: a body; an inferior bifurcated condylar yoke extending from an inferior end of the body, the inferior bifurcated condylar yoke having a first arm and a second arm, the first arm having a first bone engaging surface disposed on a side of the first arm, the first bone engaging surface being configured for complementary matching with a first set of anatomical surface features of a selected region of the patient's natural bone, the second arm having a second bone engaging surface disposed on a side of the second arm, the second bone engaging surface being configured for complementary matching with a second set of anatomical surface features of a selected region of the patient's natural bone, a superior positioning member extending from a superior end of the body, and an anteromedial flange extending from the body between the inferior bifurcated condylar yoke and the superior positioning member, wherein the anteromedial flange is disposed at an offset angle relative to a femoral reference sagittal plane of the body, the femoral reference sagittal plane of the body being disposed coplanar with a height and width of the body at a location wherein the anteromedial flange abuts the body, and wherein the anteromedial flange has resection guide fixation means; and a femoral resection guide having complementary resection guide fixation means configured to engage the resection guide fixation means of the anteromedial flange.

In any such exemplary patient-specific femoral resection guide locator assembly, the resection guide fixation means of the anteromedial flange can be fixation pins configured to be disposed through fixation pin through bores in the anteromedial flange.

In any such exemplary patient-specific femoral resection guide locator assembly, the resection guide fixation means of the anteromedial flange can be a guide receptacle.

An exemplary kit comprises: a patient-specific femoral resection guide locator including: a body, an inferior bifurcated condylar yoke extending from an inferior end of the body, the inferior bifurcated condylar yoke having a first arm and a second arm, the first arm having a first bone engaging surface disposed on a side of the first arm, the first bone engaging surface being configured for complementary matching with a first set of anatomical surface features of a selected region of the patient's natural bone, the second arm having a second bone engaging surface disposed on a side of the second arm, the second bone engaging surface being configured for complementary matching with a second set of anatomical surface features of a selected region of the patient's natural bone, a superior positioning member extending from a superior end of the body, and an anteromedial flange extending from the body between the inferior bifurcated condylar yoke and the superior positioning member, wherein the anteromedial flange is disposed at an offset angle relative to a femoral reference sagittal plane of the body, the femoral reference sagittal plane of the body being disposed coplanar with a height and width of the body at a location wherein a reference flange plane intersects the femoral reference sagittal plane, the reference flange plane being coplanar with a flange length and a flange height of the anteromedial flange; and a patient-specific tibial resection guide locator including: a tibial guide body, a superior bifurcated condylar yoke extending from a superior end of the tibial guide body, the superior bifurcated condylar yoke having a first tibial arm and a second tibial arm, the first tibial arm having a first tibial bone engaging surface disposed on a side of the first tibial arm, the first tibial bone engaging surface being configured for complementary matching with a first set of anatomical surface features of a selected region of the patient's natural tibial bone, the tibial second arm having a second tibial bone engaging surface disposed on a side of the second tibial arm, the second tibial bone engaging surface being configured for complementary matching with a second set of anatomical surface features of a selected region of the patient's natural tibial bone, an inferior positioning member extending from an inferior end of the tibial guide body, and a tibial anteromedial flange extending from the tibial guide body between the superior bifurcated condylar yoke and the inferior positioning member, wherein the tibial anteromedial flange is disposed at a tibial offset angle relative to a tibial reference sagittal plane of the tibial guide body, the tibial reference sagittal plane of the tibial guide body being disposed coplanar with a height and width of the tibial guide body at a location wherein a tibial reference flange plane intersects the tibial reference sagittal plane, the tibial reference flange plane being coplanar with a tibial flange length and a tibial flange height of the tibial anteromedial flange.

An exemplary patient-specific tibial resection guide locator comprises: a tibial guide body, a superior positioning member comprising a superior bifurcated condylar yoke extending from a superior end of the tibial guide body, the superior bifurcated condylar yoke having a first tibial arm and a second tibial arm, the first tibial arm having a first tibial bone engaging surface disposed on a side of the first tibial arm, the first tibial bone engaging surface being configured for complementary matching with a first set of anatomical surface features of a selected region of the patient's natural tibial bone, the tibial second arm having a second tibial bone engaging surface disposed on a side of the second tibial arm, the second tibial bone engaging surface being configured for complementary matching with a second set of anatomical surface features of a selected region of the patient's natural tibial bone, an inferior positioning member extending from an inferior end of the tibial guide body, and a tibial anteromedial flange extending from the tibial guide body between the superior bifurcated condylar yoke and the inferior positioning member, wherein the tibial anteromedial flange is disposed at a tibial offset angle relative to a reference sagittal plane of the tibial guide body, the tibial reference sagittal plane of the tibial guide body being disposed coplanar with a height and width of the tibial guide body at a location wherein a tibial reference flange plane intersects the tibial reference sagittal plane, the tibial reference flange plane being coplanar with a tibial flange length and a tibial flange height of the tibial anteromedial flange.

In any such exemplary patient-specific tibial resection guide locator, the inferior positioning member can further comprise a third bone engaging surface that is configured for complementary matching with a third set of anatomical surface features of a selected region of the patient's natural bone.

In any such exemplary patient-specific tibial resection guide locator, the anteromedial flange can further comprise a guide receptacle.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A patient-specific resection guide locator comprising:
   a body;
   a first positioning member extending from the body, the first positioning member having a bone engaging surface disposed on a side of the first positioning member, the bone engaging surface being configured for complementary matching with a set of anatomical surface features of a selected region of the patient's natural bone;
   a second positioning member extending from the body, the second positioning member being distally disposed from the first positioning member; and
   an anteromedial flange extending from the body between the first positioning member and the second positioning member,
   wherein the anteromedial flange is disposed at an offset angle relative to a reference sagittal plane of the body, the reference sagittal plane of the body being disposed coplanar with a height dimension and width dimension of the body at a location wherein a reference flange plane intersects the reference sagittal plane, the reference flange plane being coplanar with a flange length and a flange height of the anteromedial flange, and wherein the anteromedial flange has areas defining a fixation pin through bore extending through the anteromedial flange at a pin angle, the pin angle being formed by the intersection of a through bore length dimension and the reference flange plane.

2. The patient-specific resection guide locator of claim 1, wherein the anteromedial flange further comprises an area defining a guide receptacle.

3. The patient-specific resection guide locator of claim 1, wherein the first positioning member is a breakaway positioning member.

4. The patient-specific resection guide locator of claim 1, wherein the second positioning member is a breakaway positioning member.

5. The patient-specific resection guide locator of claim 1, wherein the body has areas defining a resection slot extending through the width of the body.

6. The patient-specific resection guide locator of claim 1, wherein the body has a posterior side when disposed in an installed configuration, and wherein the posterior side is configured for complementary matching with an additional set of anatomical surface features of a selected region of the patient's natural bone.

7. The patient-specific resection guide locator of claim 1, wherein the anteromedial flange is modular and removably engaged to the body.

8. The patient-specific resection guide locator of claim 1 further comprising rounded or chamfered edges at corners of the body and the first positioning member or the second positioning member.

9. A patient-specific resection guide locator comprising:
a body;
a first positioning member comprising a bifurcated condylar yoke extending from the body, the bifurcated condylar yoke having a first arm and a second arm,
the first arm having a first bone engaging surface disposed on a side of the first positioning member, the first bone engaging surface being configured for complementary matching with a first set of anatomical surface features of a first selected region of the patient's natural bone,
the second arm having a second bone engaging surface disposed on a side of a second positioning member, the second bone engaging surface being configured for complementary matching with a second set of anatomical surface features of a second selected region of the patient's natural bone;
the second positioning member extending from the body; and
an anteromedial flange extending from the body between the first positioning member and the second positioning member, wherein the anteromedial flange is disposed at an offset angle relative to a reference sagittal plane of the body, the reference sagittal plane of the body being disposed coplanar with a height dimension and width dimension of the body at a location wherein a reference flange plane intersects the reference sagittal plane, the reference flange plane being coplanar with a flange length and a flange height of the anteromedial flange, and wherein the anteromedial flange has areas defining a fixation pin through bore extending through the anteromedial flange at a pin angle, the pin angle being formed by the intersection of a through bore length dimension and the reference flange plane.

10. The patient-specific resection guide locator of claim 9, wherein the first arm further comprises a first arm fixation pin through bore and the second arm further comprises a second arm fixation pin through bore.

11. The patient-specific resection guide locator of claim 9, wherein the second positioning member is a superior positioning member, the superior positioning member further comprising a third bone engaging surface that is configured for complementary matching with a third set of anatomical surface features of a selected region of the patient's natural bone.

12. The patient-specific resection guide locator of claim 9, wherein the second positioning member is an inferior positioning member, the inferior positioning member further comprising a third bone engaging surface that is configured for complementary matching with a third set of anatomical surface features of a selected region of the patient's natural bone.

13. The patient-specific resection guide locator of claim 9, wherein the anteromedial flange further comprises a guide receptacle.

14. The patient-specific resection guide locator of claim 9, wherein the first positioning member is a breakaway positioning member.

15. The patient-specific resection guide locator of claim 9, wherein the second positioning member is a breakaway positioning member.

16. The patient-specific resection guide locator of claim 9, wherein the body has a posterior side when disposed in an installed configuration, and wherein the posterior side is configured for complementary matching with an additional set of anatomical surface features of a selected region of the patient's natural bone.

17. The patient-specific resection guide locator of claim 9, wherein the anteromedial flange is modular and removably engaged to the body.

18. The patient-specific resection guide locator of claim 9 further comprising rounded or chamfered edges at corners of the body and the first positioning member or the second positioning member.

* * * * *